US008253968B2

(12) United States Patent
Otani

(10) Patent No.: US 8,253,968 B2
(45) Date of Patent: Aug. 28, 2012

(54) IMAGE FORMING APPARATUS, CONTROL METHOD, AND PROGRAM FOR PREVENTING IMAGE OMISSION CAUSE BY REGISTRATION ERROR CORRECTION

(75) Inventor: Atsushi Otani, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 1259 days.

(21) Appl. No.: 11/554,655

(22) Filed: Oct. 31, 2006

(65) Prior Publication Data
US 2007/0103728 A1 May 10, 2007

(30) Foreign Application Priority Data
Oct. 31, 2005 (JP) ................................. 2005-317118

(51) Int. Cl.
G06K 15/00 (2006.01)
H04N 1/46 (2006.01)
(52) U.S. Cl. .......................... 358/1.18; 358/538; 358/505
(58) Field of Classification Search ........................ None
See application file for complete search history.

(56) References Cited

U.S. PATENT DOCUMENTS

| 4,763,165 | A | | 8/1988 | Watanabe | 355/14 R |
| 5,887,125 | A | * | 3/1999 | Takano et al. | 358/1.12 |
| 6,577,760 | B1 | | 6/2003 | Ohta et al. | 382/167 |
| 2003/0123073 | A1 | | 7/2003 | Ohta et al. | 358/1.9 |
| 2004/0212648 | A1 | * | 10/2004 | Arakawa et al. | 347/14 |
| 2005/0105104 | A1 | | 5/2005 | Sakai et al. | 358/1.1 |
| 2006/0039627 | A1 | * | 2/2006 | Li et al. | 382/289 |
| 2006/0216047 | A1 | * | 9/2006 | Yamamoto et al. | 399/45 |

FOREIGN PATENT DOCUMENTS

| JP | 61-212863 | | 9/1988 |
| JP | 11-261805 | | 9/1999 |
| JP | 2000347482 A | * | 12/2000 |
| JP | 2002-116394 | | 4/2002 |
| JP | 2003-241131 | | 8/2003 |
| JP | 2004-170755 | | 6/2004 |
| JP | 2005-7621 | | 1/2005 |
| JP | 2005-0132051 | | 5/2005 |

OTHER PUBLICATIONS

Extended European Search Report dated May 27, 2011 in counterpart application No. 06123153.6.

* cited by examiner

Primary Examiner — Mark K Zimmerman
Assistant Examiner — Fan Zhang
(74) Attorney, Agent, or Firm — Fitzpatrick, Cella, Harper & Scinto

(57) ABSTRACT

This invention provides an image forming apparatus capable of preventing image omission caused by registration error correction, a control method therefor, and a program. Error amount information is acquired which is stored in a storage medium and represents the error amount of the scanning line of exposure light in the exposure scanning direction on an image carrier. The image data is modified on the basis of the acquired error amount information. A masked area for restricting the output position of an image visualized on the printing medium is modified on the basis of the modification amount of the modified image data.

13 Claims, 19 Drawing Sheets

FIG. 6

| REGION | WIDTH (mm) | SLOPE (mm) |
|---|---|---|
| REGION 1 | L1 | m1 |
| REGION 2 | L2 | m2 |
| REGION 3 | L3 | m3 |

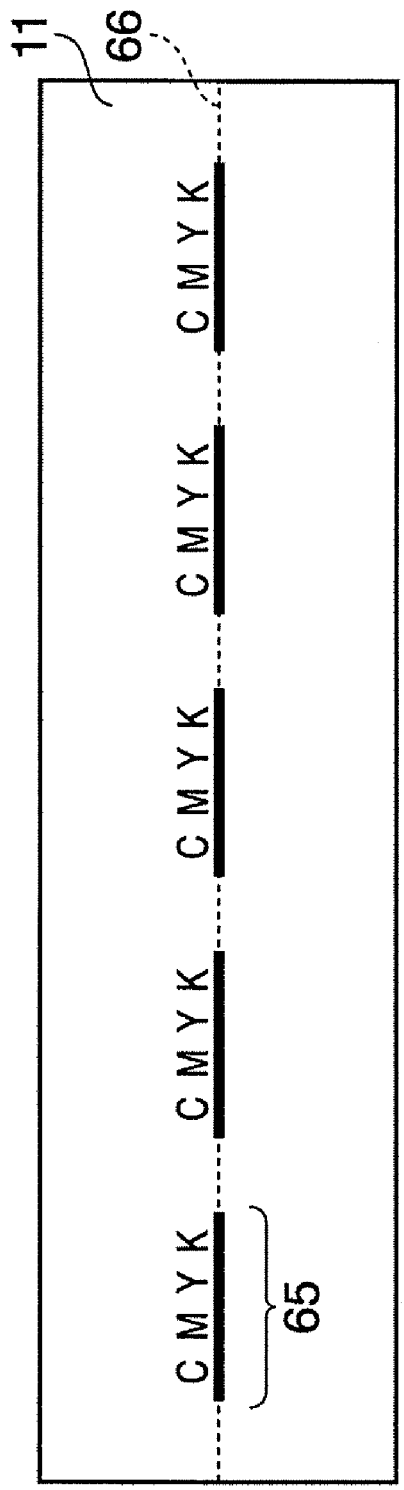
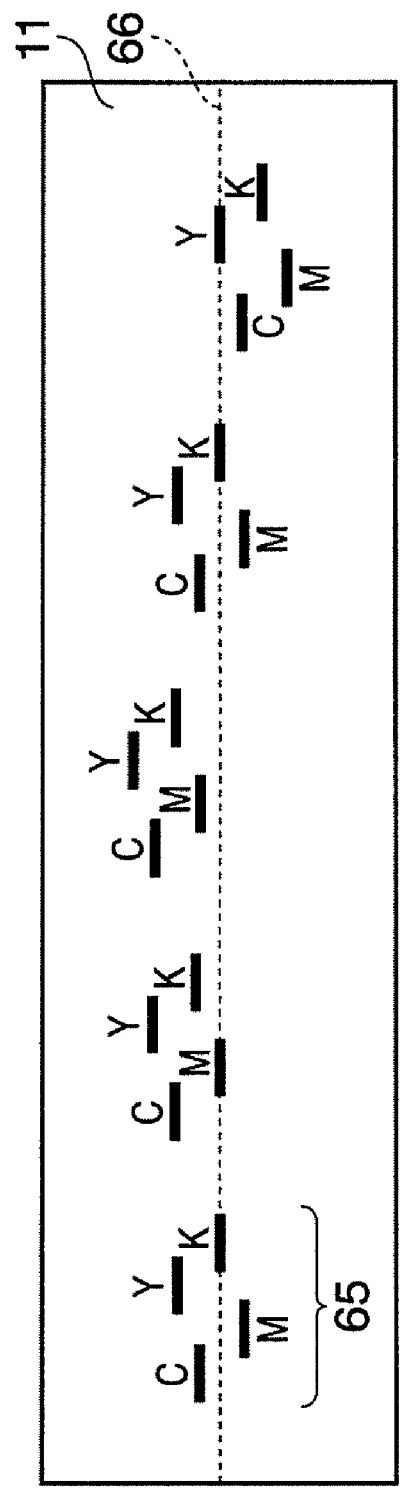

FIG. 10A
SLOPE ERROR AMOUNT
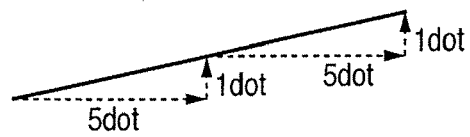
FIG. 10B
BITMAP IMAGE
(BEFORE TONE CORRECTION)
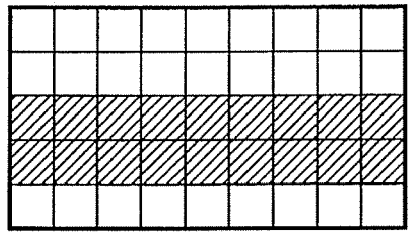
FIG. 10C
CORRECTED BITMAP IMAGE
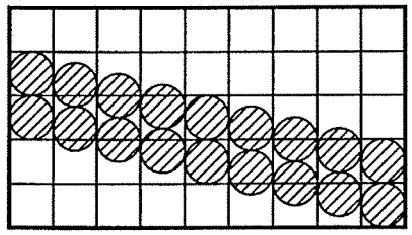
FIG. 10D
CORRECTION AMOUNT
| Δy | 0 | 0.25 | 0.5 | 0.75 | 1 | 1.25 | 1.5 | 1.75 | 2 |
|---|---|---|---|---|---|---|---|---|---|
| k | 0 | 0 | 0 | 0 | 1 | 1 | 1 | 1 | 2 |
| β = Δy−k | 0 | 0.25 | 0.5 | 0.75 | 0 | 0.25 | 0.5 | 0.75 | 0 |
| α = 1−β | 1 | 0.75 | 0.5 | 0.25 | 1 | 0.75 | 0.5 | 0.25 | 1 |
FIG. 10E
BITMAP IMAGE
(AFTER TONE CORRECTION)
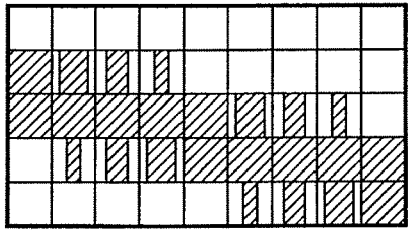
FIG. 10F
EXPOSURE IMAGE
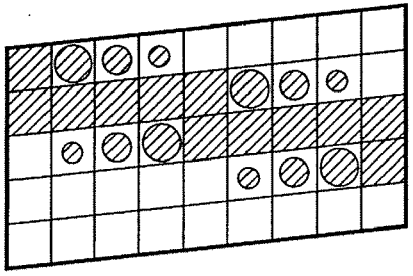

FIG. 11A
CORRECTION AMOUNT
| Δy | 0 | 0.25 | 0.5 | 0.75 | 1 | 1.25 | 1.5 | 1.75 | 2 |
|---|---|---|---|---|---|---|---|---|---|
| k | 0 | 0 | 0 | 0 | 1 | 1 | 1 | 1 | 2 |
| β=0 | 0 | 0 | 0 | 0 | 0 | 0 | 0 | 0 | 0 |
| α=1 | 1 | 1 | 1 | 1 | 1 | 1 | 1 | 1 | 1 |
FIG. 11B
BITMAP IMAGE
(AFTER TONE CORRECTION)
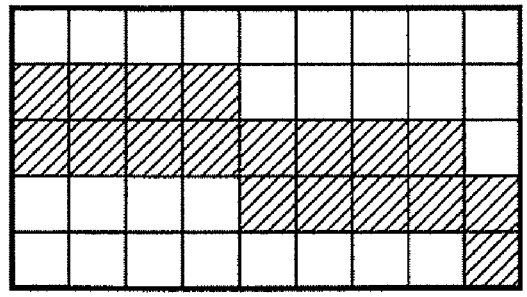
FIG. 11C
EXPOSURE IMAGE
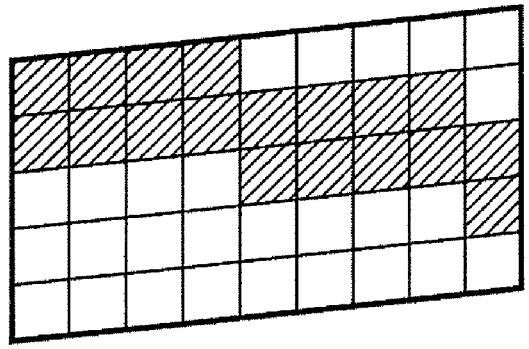

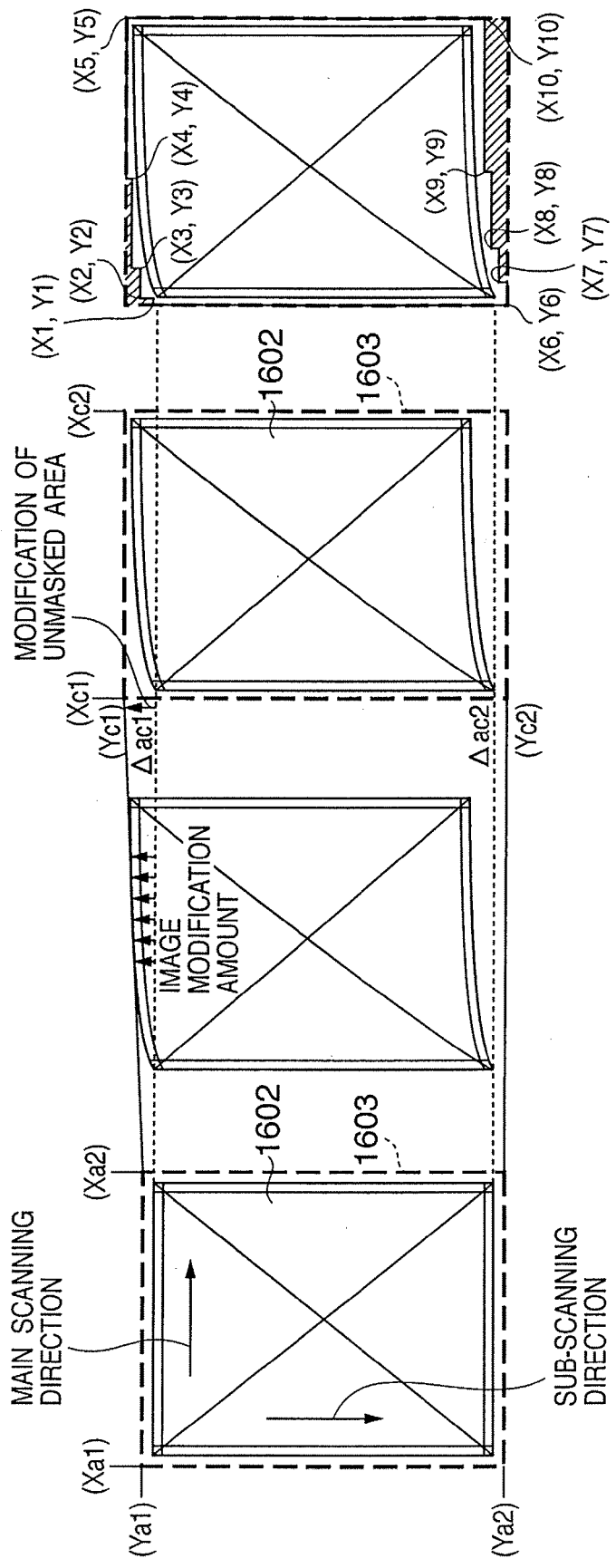

FIG. 15A
FIG. 15B
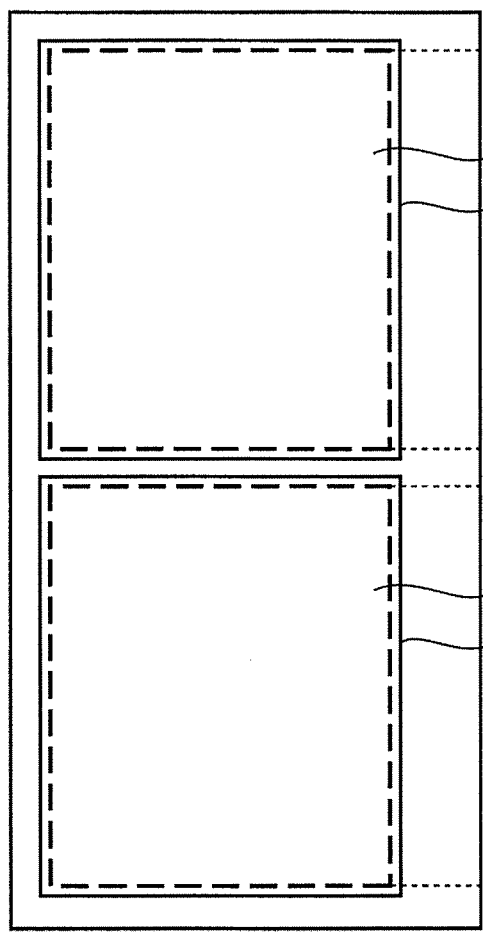
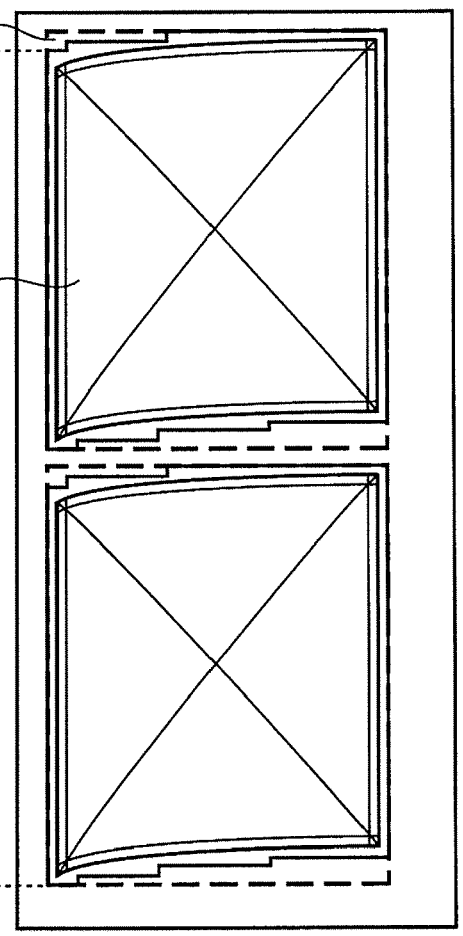

FIG. 17A-1
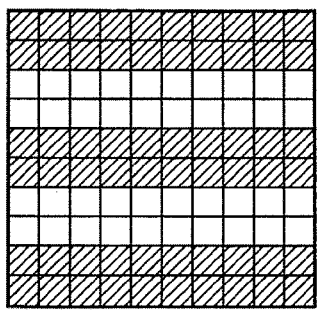
FIG. 17A-2
FIG. 17A-3
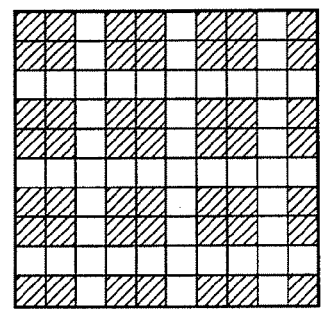
FIG. 17A-4
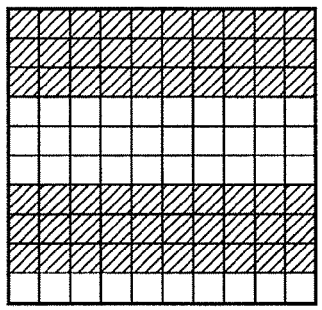
FIG. 17A-5
FIG. 17A-6
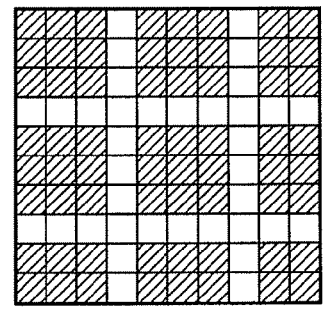
FIG. 17B-1
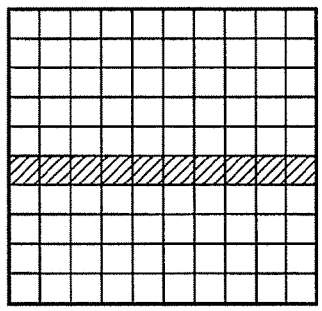
FIG. 17B-2
FIG. 17B-3
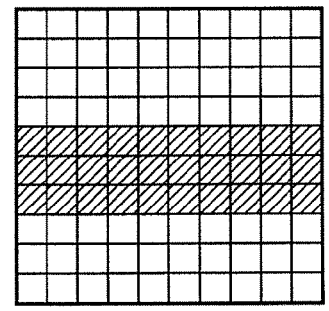

FIG. 19

| | C0 | C1 | C2 | C3 | C4 |
|---|---|---|---|---|---|
| | 0 | 0 | 0 | 0 | 0 |
| | 0 | 0 | 0 | 0 | 1 |
| | 0 | 0 | 0 | 0 | 2 |
| | 0 | 0 | 0 | 0 | 2 |
| | 0 | 0 | 0 | 0 | 2 |
| | 0 | 0 | 0 | 0 | 3 |
| | 0 | 0 | 0 | 0 | 4 |
| | 0 | 0 | 1 | 1 | 4 |
| | 255 | 1 | 0 | 1 | 4 |
| | 255 | 0 | 0 | 0 | 4 |
| | 255 | 0 | 0 | 0 | 4 |
| | 255 | 0 | 1 | 1 | 4 |
| | 0 | 1 | 0 | 1 | 4 |
| | 0 | 0 | 0 | 0 | 4 |
| | 0 | 0 | 0 | 0 | 3 |
| | 0 | 0 | 0 | 0 | 2 |
| | 0 | 0 | 0 | 0 | 2 |
| | 0 | 0 | 0 | 0 | 2 |
| | 0 | 0 | 0 | 0 | 1 |
| | 0 | 0 | 0 | 0 | 0 |

IMAGE FORMING APPARATUS, CONTROL METHOD, AND PROGRAM FOR PREVENTING IMAGE OMISSION CAUSE BY REGISTRATION ERROR CORRECTION

BACKGROUND OF THE INVENTION

1. Field of the Invention

The present invention relates to an image forming technique of forming an image based on image data by using an image processing section having an exposure unit which scans and exposes an image carrier, and a developing unit which visualizes, on a printing medium, an electrostatic latent image formed on the image carrier by scanning exposure of the exposure unit.

2. Description of the Related Art

These days, tandem type color image forming apparatuses are popular. The color image forming apparatuses of this type comprises developing units and photosensitive drums equal in number to coloring materials in order to increase the image forming speed of an electrophotographic color image forming apparatus. This color image forming apparatus sequentially transfers images of different colors onto an image convey belt or printing medium. It has already been known that the tandem type color image forming apparatus has a plurality of factors which cause a registration error. Various measures against the respective factors have been proposed.

One of the factors is the nonuniformity and mounting position error of the lens of a deflection scanning device, and the mounting position error of the deflection scanning device to a color image forming apparatus main body. In this case, the scanning line inclines or curves, and the slope and curvature change between colors, which appears as a registration error.

As a measure against the registration error, Japanese Patent Laid-Open No. 2002-116394 discloses a method of measuring the curvature of the scanning line by using an optical sensor in the deflection scanning device assembly step, mechanically rotating the lens to adjust the curvature of the scanning line, and fixing the deflection scanning device with an adhesive.

Japanese Patent Laid-Open No. 2003-241131 discloses a method of measuring the slope of the scanning line by using an optical sensor in the step of mounting a deflection scanning device in a color image forming apparatus main body, mechanically inclining the deflection scanning device to adjust the slope of the scanning line, and mounting the deflection scanning device in the color image forming apparatus main body.

Japanese Patent Laid-Open No. 2004-170755 discloses a method of measuring the slope and curvature of the scanning line by using an optical sensor, correcting bitmap image data so as to cancel the slope and curvature, and forming a corrected image. This method electrically corrects a registration error by processing image data. The method disclosed in Japanese Patent Laid-Open No. 2004-170755 can cope with a registration error at lower cost than the methods disclosed in Japanese Patent Laid-Open Nos. 2002-116394 and 2003-241131 because neither the mechanical adjustment member nor the adjustment step in assembly is necessary.

Electrical registration error correction as disclosed in Japanese Patent Laid-Open No. 2004-170755 is divided into correction of each pixel and correction of smaller than one pixel. In correction of each pixel, each pixel is offset in the sub-scanning direction in accordance with the slope and curvature correction amounts. In correction of smaller than one pixel, the tone value of bitmap image data is adjusted in preceding and succeeding pixels in the sub-scanning direction. Correction of smaller than one pixel can eliminate an unnatural step which appears at the offset boundary due to correction of each pixel, and can smooth an image.

Japanese Patent Laid-Open No. 2005-7621 discloses a method of masking a laser output so as not to print in an area other than a printable area corresponding to the printing paper range.

However, the above prior arts pose the following problems.

In electrical registration error correction, which is one of measures against a registration error, electrical correction means modifying, e.g., a rectangular image. If an image is modified to mask a laser output in an area other than the printable area, an effective image area modified in accordance with the image modification amount is masked with the masked area, omitting an image.

SUMMARY OF THE INVENTION

The present invention has been made to solve the conventional drawbacks, and has as its object to provide an image forming apparatus capable of preventing image omission caused by registration error correction, a control method therefor, and a program.

According to the present invention, the foregoing object is attained by providing an image forming apparatus which forms an image based on image data by using an image processing section having an image carrier, an exposure unit which scans and exposes the image carrier, and a developing unit which visualizes, on a printing medium, an electrostatic latent image formed on the image carrier by scanning exposure of the exposure unit, comprising:

image data storage means for storing image data;

storage means for storing error amount information representing an error amount of a scanning line of exposure light in an exposure scanning direction on the image carrier;

first modification means for modifying the image data on the basis of the error amount information stored in the storage means; and second modification means for modifying a masked area for restricting an output position of an image visualized on the printing medium on the basis of a modification amount of the image data modified by the first modification means.

In a preferred embodiment, the second modification means comprises holding means for holding position information representing an image output start permission position and an image output end permission position between which output of the image visualized on the printing medium is permitted, and setting means for setting, in the holding means on the basis of the modification amount of the image data modified by the first modification means, the image output start permission position and the image output end permission position between which the output position of the image visualized on the printing medium is defined.

In a preferred embodiment, the masked area is an area outside a rectangular area containing a shape of the image data.

In a preferred embodiment, the masked area is an area outside an area which contains a shape of the image data modified by the first modification means and is similar to the shape.

In a preferred embodiment, the second modification means comprises determination means for determining whether a correction amount for modifying the masked area on the basis of the modification amount of the image data modified by the first modification means is not less than a predetermined value, and decision means for deciding, on the basis of a determination result of the determination means, whether to modify the masked area.

In a preferred embodiment,
the developing unit includes developing units corresponding to a plurality of colors, and the second modification means modifies the masked area for restricting the output position of an image visualized on the printing medium in one of the plurality of colors by a developing unit corresponding to the color.

In a preferred embodiment,
the developing units corresponding to the plurality of colors are juxtaposed in a convey direction of the printing medium, and the storage means, the first modification means, and the second modification means are arranged for each developing unit corresponding to one of the plurality of colors.

In a preferred embodiment,
the developing unit is constituted by integrating developing units corresponding to a plurality of colors, and the second modification means modifies the masked area for restricting the output position of an image visualized on the printing medium in one of the plurality of colors by the developing unit corresponding to the color.

According to the present invention, the foregoing object is attained by providing a method of controlling an image forming apparatus which forms an image based on image data by using an image processing section having an image carrier, an exposure unit which scans and exposes the image carrier, and a developing unit which visualizes, on a printing medium, an electrostatic latent image formed on the image carrier by scanning exposure of the exposure unit, comprising:

a storage step of storing image data in a storage medium;

an acquisition step of acquiring error amount information which is stored in the storage medium and represents an error amount of a scanning line of exposure light in an exposure scanning direction on the image carrier;

a first modification step of modifying the image data on the basis of the error amount information acquired in the acquisition step; and a second modification step of modifying a masked area for restricting an output position of an image visualized on the printing medium on the basis of a modification amount of the image data modified in the first modification step.

According to the present invention, the foregoing object is attained by providing a program which is stored in a computer-readable medium and causes a computer to control an image forming apparatus which forms an image based on image data by using an image processing section having an image carrier, an exposure unit which scans and exposes the image carrier, and a developing unit which visualizes, on a printing medium, an electrostatic latent image formed on the image carrier by scanning exposure of the exposure unit, causing the computer to execute a storage step of storing image data in a storage medium, an acquisition step of acquiring error amount information which is stored in the storage medium and represents an error amount of a scanning line of exposure light in an exposure scanning direction on the image carrier, a first modification step of modifying the image data on the basis of the error amount information acquired in the acquisition step, and a second modification step of modifying a masked area for restricting an output position of an image visualized on the printing medium on the basis of a modification amount of the image data modified in the first modification step.

Further features of the present invention will be apparent from the following description of exemplary embodiments with reference to the attached drawings.

BRIEF DESCRIPTION OF THE DRAWINGS

FIG. 6 is a table showing an example of information stored in a registration error amount storage unit according to the embodiment of the present invention;

FIGS. 7A and 7B are views showing an example of a registration error measurement chart according to the embodiment of the present invention;

FIGS. 10A to 10F are views for explaining a method of correcting the registration error of smaller than one pixel according to the embodiment of the present invention;

FIGS. 11A to 11C are views for explaining the method of correcting the registration error of smaller than one pixel according to the embodiment of the present invention;

FIGS. 14A to 14D are views showing the concept of changing a masked area according to the embodiment of the present invention;

FIGS. 15A and 15B are views for explaining the interference of an unmasked area in a continuous printing operation according to the embodiment of the present invention;

FIGS. 17A-1 to 17B-3 are views showing examples of a fine image and examples of an isolated thin line according to the embodiment of the present invention;

FIG. 19 is a view for explaining the determination method by the smoothing determination unit according to the embodiment of the present invention.

DESCRIPTION OF THE EMBODIMENTS

A preferred embodiment of the present invention will now be described in detail with reference to the drawings. It should be noted that the relative arrangement of the components, the numerical expressions and numerical values set forth in this embodiment do not limit the scope of the present invention unless it is specifically stated otherwise.

Figure 1:
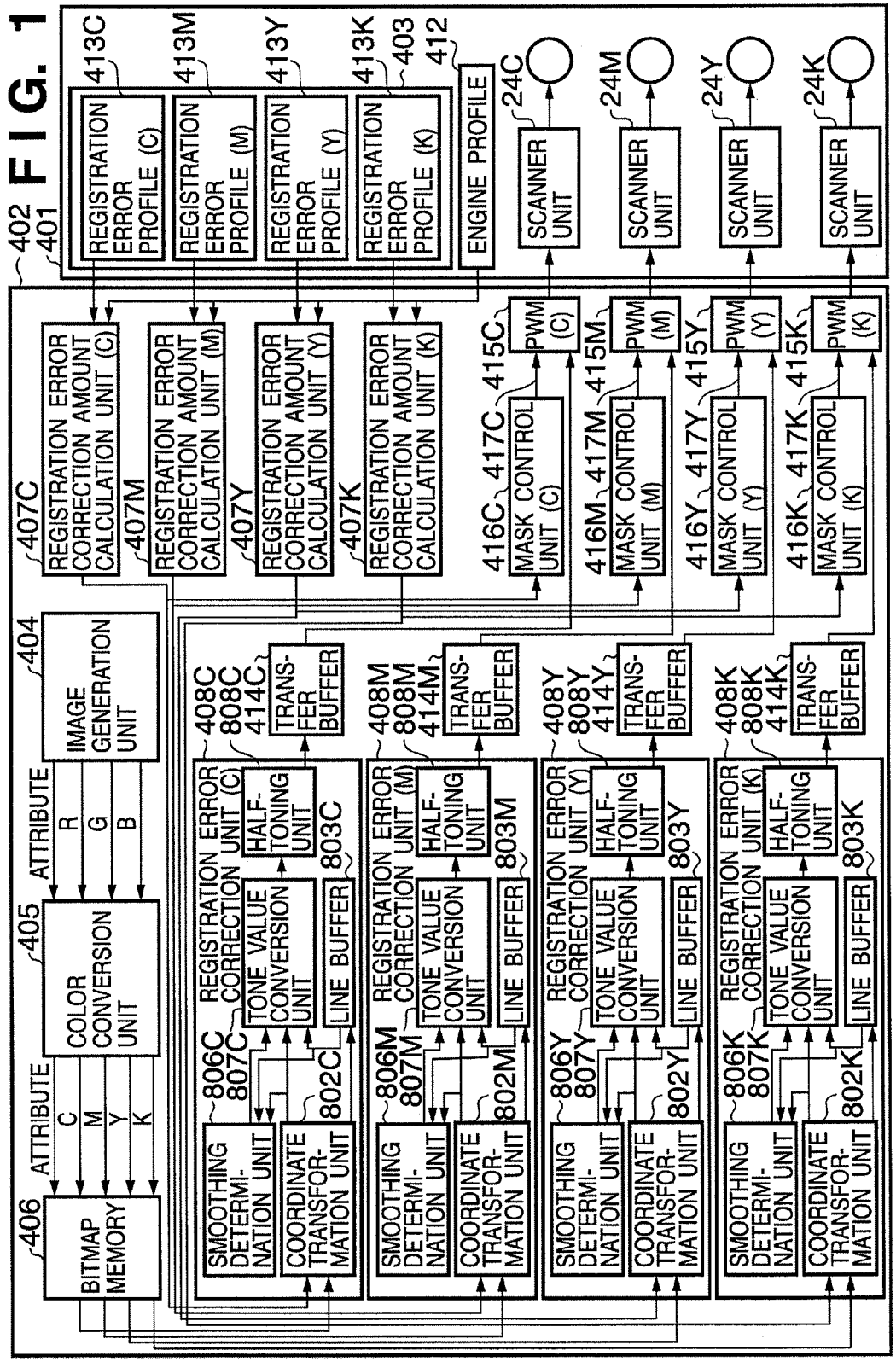
FIG. 1 is a block diagram for explaining the arrangement of blocks related to formation of an electrostatic latent image in an electrophotographic color image forming apparatus according to an embodiment of the present invention.

FIG. 1 is a block diagram for explaining the arrangement of blocks related to formation of an electrostatic latent image in an electrophotographic color image forming apparatus according to the embodiment of the present invention.

The color image forming apparatus comprises an image forming section 401 and image processing section 402. The image processing section 402 generates bitmap image information, and the image forming section 401 forms an image on a printing medium on the basis of the bitmap image information.

The final stage of the image processing section 402 has mask control units 416C, 416M, 416Y, and 416K which mask images of respective colors and control pulse modulation units (PWM) 415C, 415M, 415Y, and 415K so as not to form an image outside a predetermined area, which will be described in detail later. C corresponds to a cyan coloring material; M, a magenta one; Y, an yellow one; and K, a black one.

Figure 2:
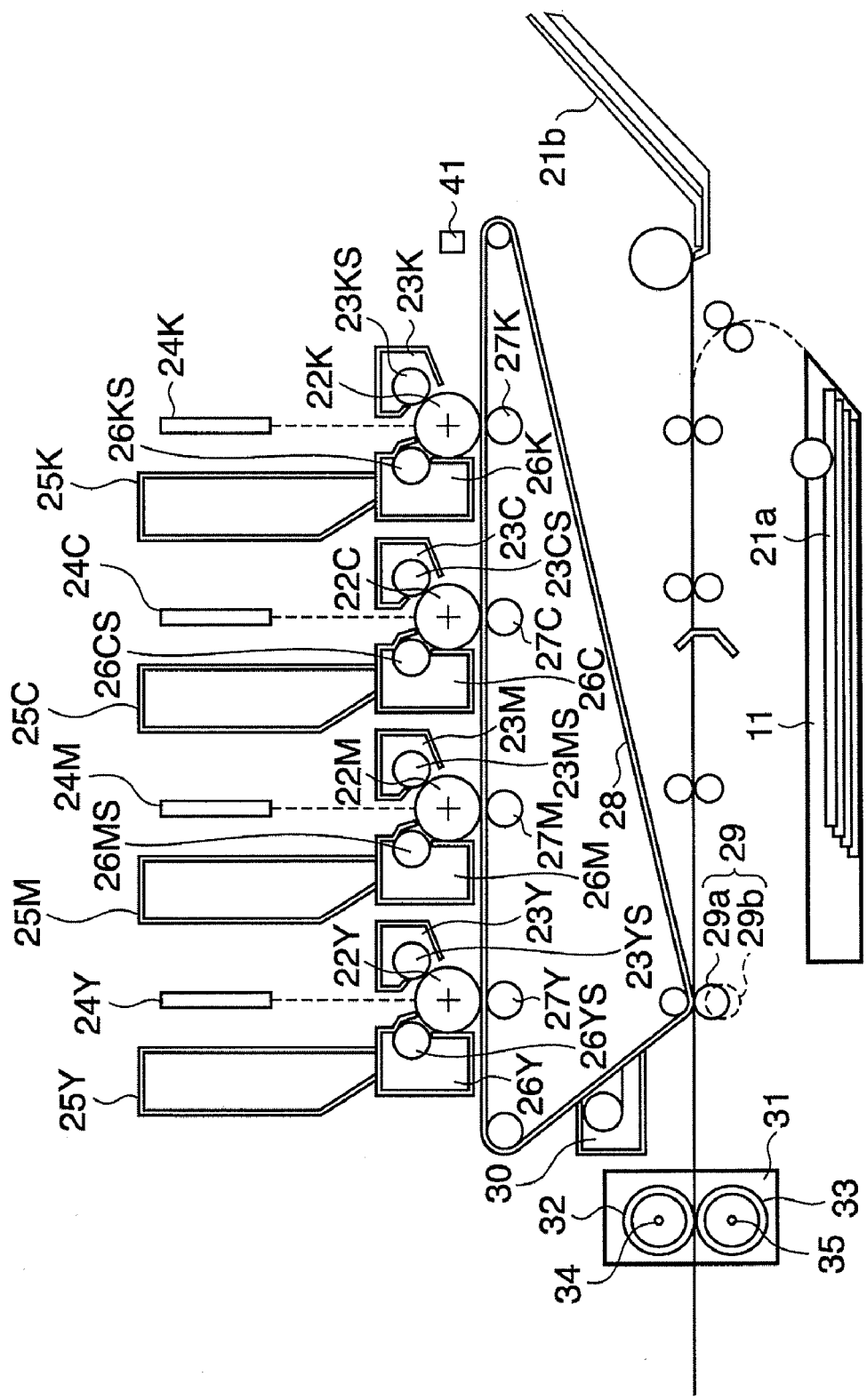
FIG. 2 is a sectional view of a tandem type color image forming apparatus adopting an intermediate transfer member as an example of the electrophotographic color image forming apparatus according to the embodiment of the present invention.

FIG. 2 is a sectional view of a tandem type color image forming apparatus adopting an intermediate transfer member as an example of the electrophotographic color image forming apparatus according to the embodiment of the present invention.

The operation of the image forming section 401 in the electrophotographic color image forming apparatus will be explained with reference to FIGS. 1 and 2.

The image forming section 401 forms an electrostatic latent image by driving exposure light in accordance with an exposure time processed by the image processing section 402. The image forming section 401 develops the electrostatic latent image to form a toner image of a single color, and superposes single-color toner images to form a multicolor toner image. The image forming section 401 transfers the multicolor toner image onto a printing medium 11, and fixes it onto the printing medium 11.

The color image forming apparatus comprises, as charging means, four injection chargers 23Y, 23M, 23C, and 23K for charging photosensitive bodies 22Y, 22M, 22C, and 22K at the yellow (Y), magenta (M), cyan (C), and black (K) stations. The respective injection chargers comprise sleeves 23YS, 23MS, 23CS, and 23KS.

The photosensitive bodies 22Y, 22M, 22C, and 22K each have an organic photoconductive layer around an aluminum cylinder. The photosensitive bodies 22Y, 22M, 22C, and 22K receive the driving force of a driving motor (not shown) to rotate. The driving motor rotates the photosensitive bodies 22Y, 22M, 22C, and 22K counterclockwise in accordance with an image forming operation.

Scanner units 24Y, 24M, 24C, and 24K serving as exposure means irradiate the corresponding photosensitive bodies 22Y, 22M, 22C, and 22K with exposure light. The scanner units 24Y, 24M, 24C, and 24K selectively expose the surfaces of the photosensitive bodies 22Y, 22M, 22C, and 22K to form electrostatic latent images on them.

The color image forming apparatus comprises four developing units 26Y, 26M, 26C, and 26K as developing means. The developing units 26Y, 26M, 26C, and 26K develop electrostatic latent images on the corresponding photosensitive bodies 22Y, 22M, 22C, and 22K in yellow (Y), magenta (M), cyan (C), and black (K) at the respective stations (developing units) in order to visualize the electrostatic latent images. The respective developing units comprise sleeves 26YS, 26MS, 26CS, and 26KS. The developing units 26Y, 26M, 26C, and 26K are detachable.

The color image forming apparatus comprises primary transfer rollers (transfer means) 27Y, 27M, 27C, and 27K in order to transfer single-color toner images from the photosensitive bodies 22Y, 22M, 22C, and 22K onto an intermediate transfer member 28. The intermediate transfer member 28 rotates clockwise to transfer single-color toner images along with rotation of the photosensitive bodies 22Y, 22M, 22C, and 22K and the facing primary transfer rollers 27Y, 27M, 27C, and 27K. The single-color toner images can be efficiently transferred onto the intermediate transfer member 28 by applying proper bias voltages to the primary transfer rollers 27Y, 27M, 27C, and 27K and setting a rotational speed difference between the photosensitive bodies 22Y, 22M, 22C, and 22K and the intermediate transfer member 28. This process is called primary transfer.

The respective stations superpose the single-color toner images on the intermediate transfer member 28. The intermediate transfer member 28 rotates to convey the superposed multicolor toner image to a secondary transfer roller (transfer means) 29. A printing medium 11 is clamped and conveyed from a feed tray 21a or manual feed tray 21b to the secondary transfer roller 29. The multicolor toner image on the intermediate transfer member 28 is transferred onto the printing medium 11. The secondary transfer roller 29 receives a proper bias voltage to electrostatically transfer the toner image. This process is called secondary transfer. The secondary transfer roller 29 abuts the printing medium 11 at a position 29a while transferring the multicolor toner image onto the printing medium 11, and moves apart to a position 29b after printing.

The color image forming apparatus comprises a fixing device (fixing means) 31 in order to fuse and fix the multicolor toner image transferred on the printing medium 11 onto the printing medium 11. The fixing device 31 has a fixing roller 32 for heating the printing medium 11, and a press roller 33 for pressing the printing medium 11 against the fixing roller 32. The fixing roller 32 and press roller 33 in the fixing device 31 are hollow and incorporate heaters 34 and 35, respectively. The fixing device 31 uses the fixing roller 32 and press roller 33 to convey the printing medium 11 bearing a multicolor toner image. At the same time, the fixing device 31 applies heat and pressure to fix the toner onto the printing medium 11.

A discharge roller (not shown) discharges the toner-fixed printing medium 11 onto a delivery tray (not shown), ending the image forming operation.

A cleaning unit 30 removes toner remaining on the intermediate transfer member 28. The cleaner container (not shown) of the cleaning unit 30 stores waste toner remaining after transferring the 4-color toner image formed on the intermediate transfer member 28 onto the printing medium 11.

Figure 3:
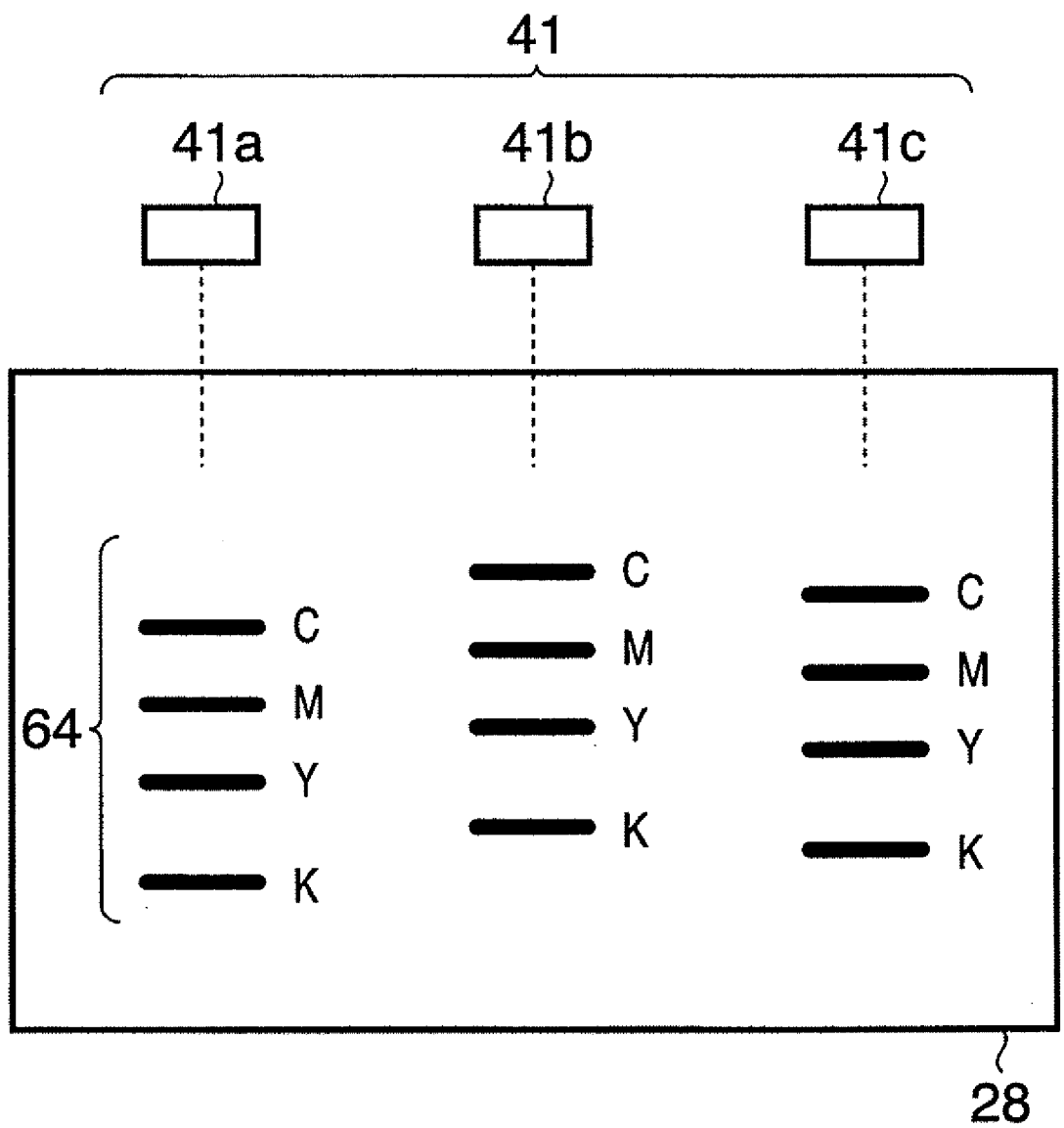
FIG. 3 is a view showing an example of a registration detection patch according to the embodiment of the present invention.

A registration detection sensor 41 faces the intermediate transfer member 28. The intermediate transfer member 28 bears registration detection patches 64 (FIG. 3), and the registration detection sensor 41 determines the registration error amounts of the respective colors from patch detection timings. FIG. 3 shows an example of the registration detection patch. The registration detection sensor 41 comprises three registration detection sensors 41a, 41b, and 41c in the scanning direction. The registration detection patches 64 for C, M, Y and K colors pass below the respective sensors.

The degree of deviation (slope and curvature) of the scanning line of exposure light output from the each scanner unit 24, i.e., 24Y, 24M, 24C, or 24K can be measured by detecting registration errors at three, right, center, and left portions in the scanning direction, as shown in FIG. 3. Some color image forming apparatuses comprise the registration detection sensors 41 at only two, right and left portions. In this case, only the slope of exposure light output from each scanner unit 24 can be measured.

Figure 4:
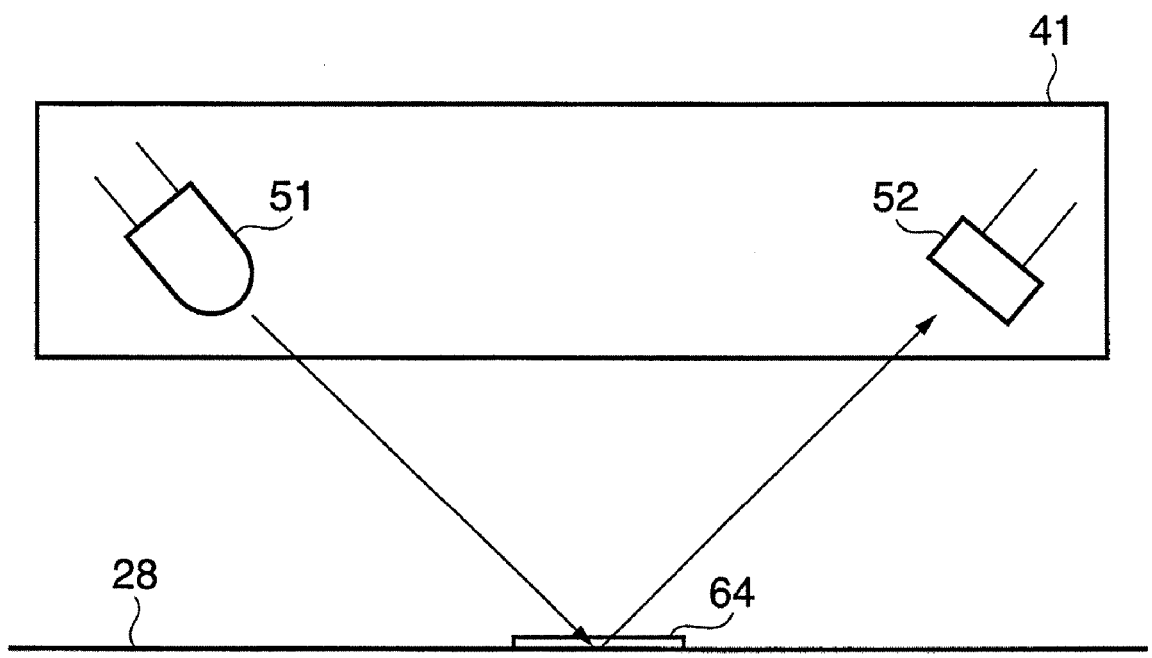
FIG. 4 is a view showing an example of the structure of a registration detection sensor according to the embodiment of the present invention.

FIG. 4 shows an example of the structure of the registration detection sensor 41. The registration detection sensor 41 comprises an infrared-emitting element 51 such as an LED, a light-receiving element 52 such as a photodiode, and a processing circuit (not shown) such as an IC for processing light reception data. A holder (not shown) stores these building elements to constitute the registration detection sensor 41.

The light-receiving element 52 detects the intensity of light reflected by the registration detection patch 64 (toner patch). The arrangement in FIG. 4 detects regularly reflected light, but is not limited to this and may detect diffusedly reflected light. Coupling between the infrared-emitting element 51 and the light-receiving element 52 sometimes uses an optical element (not shown) such as a lens.

The registration error of the scanning line will be explained with reference to FIG. 5.

Reference numeral 301 denotes an ideal scanning line along which exposure light scans the photosensitive body 22, i.e., 22Y, 22M, 22C, or 22K perpendicularly to the rotational direction. Reference numeral 302 denotes an actual scanning line which has a slope and curvature owing to the positional precision and eccentricity of the photosensitive body 22, and the positional precision of the optical system in the scanner unit 24 for each color. The slope and curvature of the scanning line 302 are different between the C, M, Y, and K image stations. For this reason, a registration error appears in an image obtained by transferring toner images of all the colors onto the intermediate transfer member 28.

In the embodiment, the error amount of the actual scanning line 302 from the ideal scanning line 301 in the sub-scanning direction is measured at a plurality of points (points B, C, and D) using, as a reference point, point A which is the scanning start position of the printing region in the main scanning direction (X direction). The printing region is divided into a plurality of regions (region 1 between Pa and Pb, region 2 between Pb and Pc, and region 3 between Pc and Pd) between points at which the error amount is measured. The slope of the scanning line in each region is approximated by a straight line (Lab, Lbc, or Lcd) connecting points.

When the difference between point-to-point error amounts (m1 in region 1, m2−m1 in region 2, and m3−m2 in region 3) is positive, the scanning line in the region inclines up to the right; when the difference is negative, it inclines down to the right.

The process of the image processing section 402 in the color image forming apparatus will be explained with reference to FIG. 1.

An image generation unit 404 generates printable raster image data from printing data received from a host apparatus (not shown) such as a personal computer, and outputs the raster image data of each pixel as RGB data and attribute data representing the data attribute of the pixel.

Reference numeral 405 denotes a color conversion unit which converts RGB data into CMYK data in accordance with the toner color of the image forming section 401, and stores the CMYK data and attribute data in a bitmap memory 406. The bitmap memory 406 temporarily stores raster image data to be printed, and is a page memory for storing 1-page image data or a band memory for storing data of a plurality of lines.

Reference numerals 408C, 408M, 408Y, and 408K denote registration error correction units which correct C, M, Y, and K registration errors caused by the slope and curvature of the scanning line. The process in the registration error correction unit 408, i.e., 408C, 408M, 408Y, or 408K will be described in detail later. Transfer buffers 414C, 414M, 414Y, and 414K hold bitmap images whose registration errors are corrected for the respective colors. The PWM units 415C, 415M, 415Y, and 415K convert the bitmap images held in the transfer buffers 414C, 414M, 414Y, and 414K into exposure times in the scanner units 24C, 24M, 24Y, and 24K.

Note that PWM stands for pulse width modulation.

Details of a registration error correction method in the embodiment will be described with reference to FIG. 1. Rough procedures are as follows.

(A) A registration error amount storage unit 403 stores pieces of registration error profile information 413C, 413M, 413Y, and 413K of C, M, Y, and K colors.

(B) Registration error correction amount calculation units 407C, 407M, 407Y, and 407K calculate the correction amounts of pixels of the respective colors on the basis of the pieces of registration error profile information 413C, 413M, 413Y, and 413K and engine profile information 412.

(C) The registration error correction units 408C, 408M, 408Y, and 408K correct bitmap data on the basis of the calculated pixel correction amounts.

Processes (A) to (C) will be described in detail.

In process (A), the registration error amount storage unit 403 arranged in the image forming section 401 stores the pieces of registration error profile information 413, i.e., 413C, 413M, 413Y, and 413K of the respective colors. The profile format includes, e.g., error amounts of the actual scanning line 302 from the ideal scanning line 301 in the sub-scanning direction that are measured at a plurality of points for each color of C, M, Y, and K colors (see FIG. 5). The table in FIG. 6 is an example of information stored in the registration error amount storage unit 403. The profile format is not limited to this, and suffices to represent the slope and curvature characteristics of the scanning line.

The registration error profile information 413 stored in the registration error amount storage unit 403 can be acquired by several methods.

According to the first method, the registration error amount is measured and acquired in the color image forming apparatus manufacturing step.

According to the second method, the registration detection sensor 41 is used to acquire a registration error amount from the detection result of the registration detection patch 64 formed on the intermediate transfer member 28.

According to the third method, an image forming apparatus outputs a registration error measurement chart as shown in FIGS. 7A and 7B. An image input apparatus such as a commercially available image scanner converts the image into electronic information to acquire registration error profile information from the information.

An example of the third method will be explained with reference to FIGS. 7A and 7B.

FIGS. 7A and 7B show registration error measurement patches 65 formed on the printing medium 11. A color image forming apparatus forms an image so as to align the C, M, Y, and K registration error measurement patches 65 on a scanning line 66, as shown in FIG. 7A. In practice, the registration error measurement patches 65 shift from the scanning line 66, as shown in FIG. 7B. The error amount of an image obtained from the image input apparatus from electronic information can be measured to obtain pieces of registration error profile information of C, M, Y, and K colors.

In process (B), the registration error correction amount calculation unit 407, i.e., 407C, 407M, 407Y, or 407K calculates a registration error correction amount. More specifically, the registration error correction amount calculation unit 407 calculates a correction amount for canceling a registration error on the basis of the registration error profile information 413 stored in the registration error amount storage unit 403, and outputs the calculated correction amount to the registration error correction unit 408.

Figure 5:
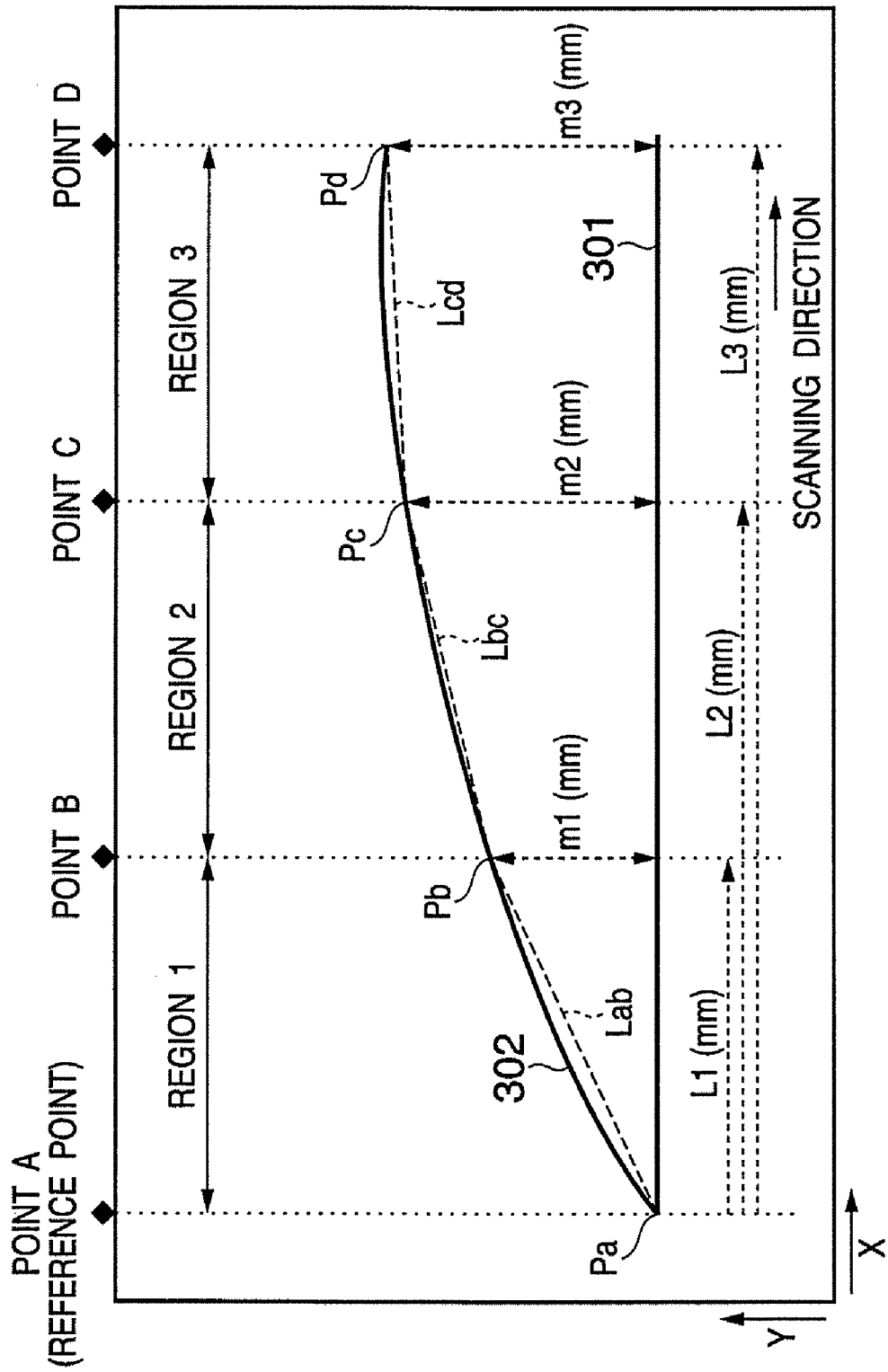
FIG. 5 is a graph for explaining a registration error according to the embodiment of the present invention.

Letting x (dot) be coordinate data in the main scanning direction and $\Delta y$ (dot) be the registration error correction amount in the sub-scanning direction, the arithmetic expressions of respective regions in FIG. 5 are as follows (image forming resolution=r (dpi)):

Region 1: $\Delta y1 = x*(m1/L1)$

Region 2: $\Delta y2 = m1/r + (x-(L1/r))*((m2-m1)/(L2-L1))$

Region 3: $\Delta y3 = m2/r + (x-(L2/r))*((m3-m2)/(L3-L2))$ where L1, L2, and L3 are distances (mm) from the printing start position to the right ends of regions 1, 2, and 3, respectively, and m1, m2, and m3 are error amounts of the actual scanning line 302 from the ideal scanning line 301 at the right ends of regions 1, 2, and 3, respectively.

The registration error correction amount calculation unit 407 calculates the slope $\Delta ys$ in each region from a deviation at a measurement point. Hence, the slope $\Delta ys$ in each pixel in all the regions is given by $(0 \leq x < L1)$ $\Delta ys = x*(m1/L1)$ $(L1 \leq x < L1+L2)$ $\Delta ys = m1/r + (x-(L1/r))*((m2-m1)/(L2-L1))$ $(L1+L2 \leq x < L1+L2+L3)$ $\Delta ys = m2/r + (x-(L2/r))*((m3-m2)/(L3-L2))$ After determining $\Delta ys$, the registration error correction amount calculation unit 407 calculates the value x at which $\Delta ys$ reaches an integer number of dots at the current image forming resolution. The registration error correction amount calculation unit 407 changes, by x, the vertical read position of a coordinate transformation unit 802, i.e., 802C, 802M, 802Y, or 802K.

Figure 8:
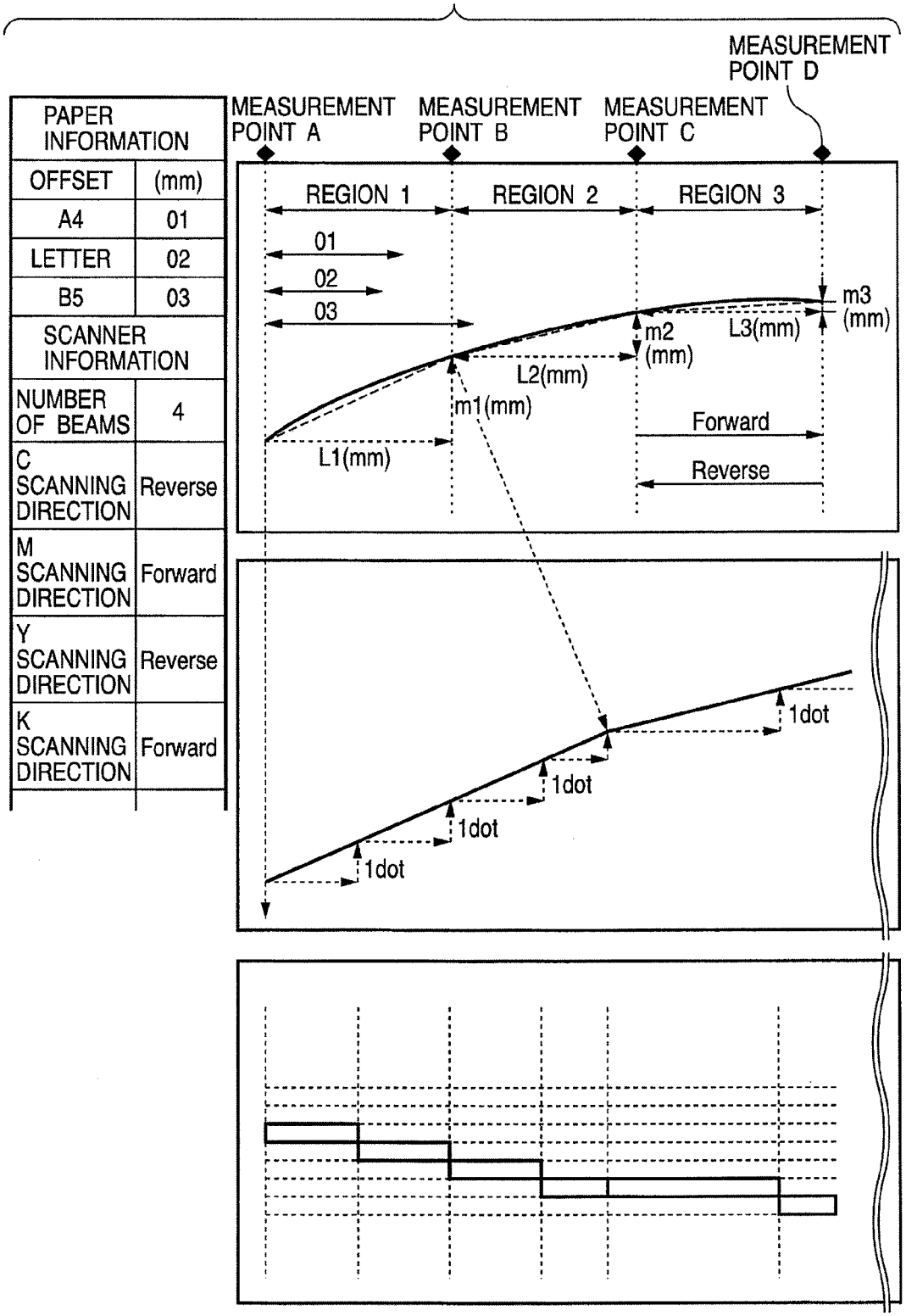
FIG. 8 is a view showing the relationship between the engine profile and the exposure profile according to the embodiment of the present invention.

Engine profile information stored in the engine profile storage unit 412 contains offset amount information from a reference point at the paper size, scanning direction information of exposure light (beam) of the scanner unit 24 for each color, and the printing medium convey speed. FIG. 8 shows the relationship between an example of the engine profile and the exposure profile (registration error profile).

When the scanning direction changes, a sign must be added to a correction amount in accordance with the scanning direction. For example, the registration error amount shown in FIG. 8 is calculated using a negative sign in the forward scanning direction and a positive sign in the reverse scanning direction.

When the printing speed changes, the correction amount must be changed in accordance with the printing speed. For example, when the image forming speed is ½ of the normal one, an image is output by one of two scanning operations without changing the scanning speed, and no image is output by the other scanning operation. The correction amount at this time must be ½ of that at the normal speed. The correction amount must be calculated in accordance with the paper size using the engine profile of a region corresponding to the paper size.

In process (C), the registration error correction unit 408 corrects bitmap data on the basis of the calculated correction amount of each pixel. The registration error correction unit 408 comprises the coordinate transformation unit 802, a line buffer 803, a smoothing determination unit 806, a tone value conversion unit 807, and a halftoning unit 808.

The line buffer 803 is a memory for each line, and stores information of each line by a correction amount from the bitmap memory 406.

The coordinate transformation unit 802 executes a correction process corresponding to the integral part of the correction amount $\Delta y$ of the line buffer 803 on the basis of coordinate position data in the main scanning and sub-scanning directions, and the correction amount $\Delta y$ obtained from the registration error correction amount calculation unit 407. That is, the coordinate transformation unit 802 corrects the registration error of each pixel, and reconstructs output image data.

A correction process in the coordinate transformation unit 802 will be explained with reference to FIGS. 9A to 9C.

Figure 9A:
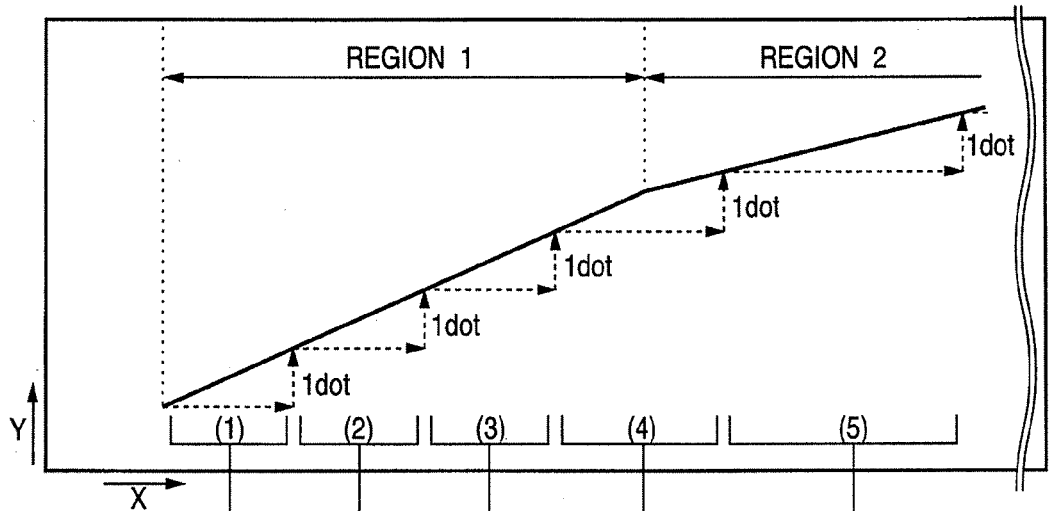
FIGS. 9A to 9C are views for explaining a method of correcting the registration error of each pixel according to the embodiment of the present invention.

The coordinate transformation unit 802 offsets the coordinate of image data in the sub-scanning direction (Y direction) in the bitmap memory 406 in accordance with the value of the integral part of the registration error correction amount $\Delta y$ calculated from registration error information of a linearly approximated scanning line in FIG. 9A.

Figure 9B:
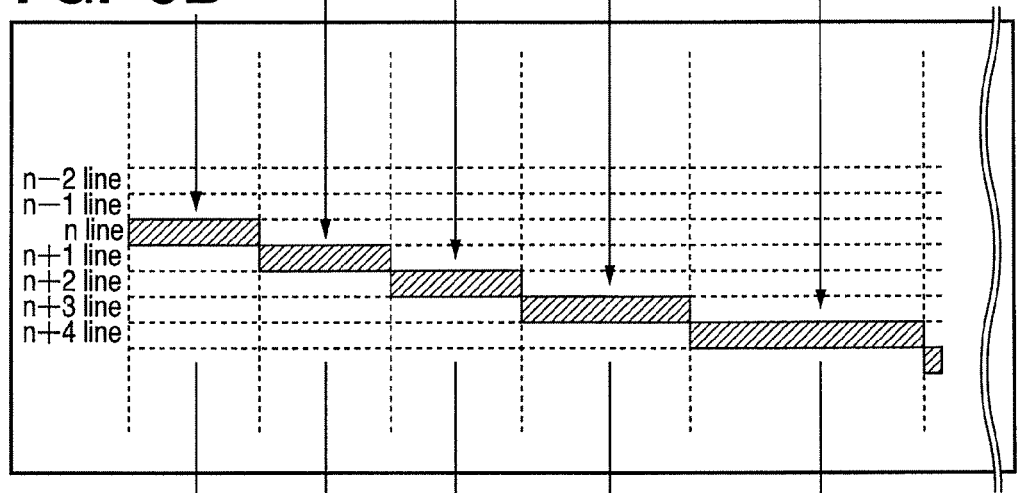
Figure 9C:
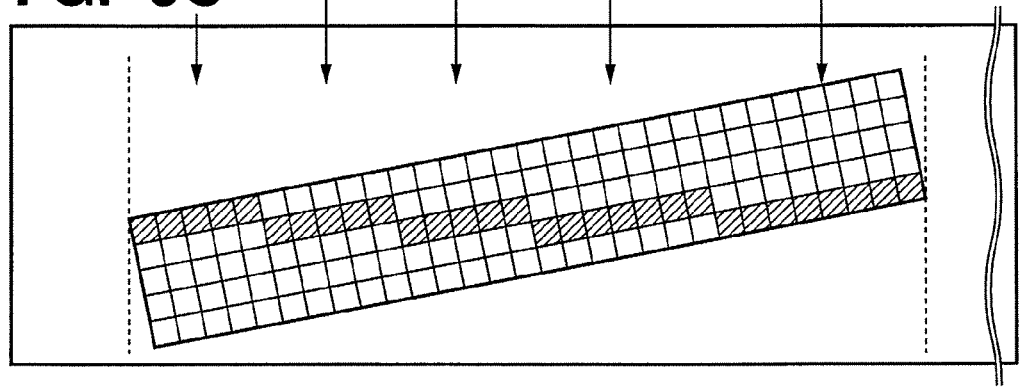

For example, when reconstructing data whose coordinate position in the sub-scanning direction is the nth line, X represents the coordinate position in the main scanning direction, as shown in FIG. 9B. In region (1), the registration error correction amount $\Delta y$ is 0 (inclusive) to 1 (exclusive) at the X coordinate in the main scanning direction. The coordinate transformation unit 802 reads out data of the nth line from the bitmap memory.

In region (2), the registration error correction amount $\Delta y$ is 1 (inclusive) to 2 (exclusive). The coordinate transformation unit 802 transforms the coordinates so as to read out a bitmap image at a position offset by one line, i.e., data of the (n+1)th line from the bitmap memory.

Similarly, the coordinate transformation unit 802 transforms the coordinates so as to read out data of the (n+2)th line in region (3) and data of the (n+3)th line in region (4).

By this method, the coordinate transformation unit 802 reconstructs output image data. FIG. 9C shows an example in a case that an exposure image obtained by exposing, for example, the image carrier (intermediate transfer member 28) to image data having undergone registration error correction for each pixel by the coordinate transformation unit 802.

Registration error correction of smaller than one pixel by the tone value conversion unit 807, i.e., a correction process for an error amount at the decimal part of the registration error correction amount $\Delta y$ will be explained with reference to FIGS. 10A to 10F. The error amount at the decimal part is corrected by adjusting the tone values of preceding and succeeding pixels in the sub-scanning direction.

FIG. 10A shows an image of a scanning line having an upward slope to the right. FIG. 10B shows a bitmap image of a horizontal straight line before tone value conversion. FIG.

10C shows a correction image for canceling a registration error caused by the slope of the scanning line in FIG. 10A.

To obtain the correction image in FIG. 10C, the tone value conversion unit 807 adjusts the tone values of preceding and succeeding pixels in the sub-scanning direction. FIG. 10D is a table (tone value conversion table) representing the relationship between the registration error correction amount Δy and the correction coefficient for converting a tone value.

In FIG. 10D, k is the integral part of the registration error correction amount Δy (decimal part is rounded down) and represents the correction amount of one pixel in the sub-scanning direction. In FIG. 10D, β and α represent correction coefficients for performing correction of smaller than one pixel in the sub-scanning direction. The correction coefficients β and α represent the distribution factors of the tone values of preceding and succeeding pixels in the sub-scanning direction on the basis of decimal part information of Δy. The correction coefficients β and α are given by $$\beta = \Delta y - k$$

$$\alpha = 1 - \beta$$

where α is the distribution factor of a preceding pixel, and β is that of a succeeding pixel.

FIG. 10E shows a bitmap image having undergone tone value conversion to adjust the ratio of the tone values of preceding and succeeding pixels in the sub-scanning direction in accordance with correction coefficients in the tone value conversion table of FIG. 10D. FIG. 10F shows an exposure image of the tone value-converted bitmap image on the image carrier. In FIG. 10F, the slope of the main scanning line is canceled to form a horizontal straight line.

For high image quality, it is preferable not to execute correction of smaller than one pixel in a fine image, which will be described later with reference to FIGS. 17A-1 to 17B-3. In this case, as shown in FIGS. 11A to 11C, the distribution factors of the tone values of preceding and succeeding pixels in the sub-scanning direction are uniformly set to $$\beta = 0$$

$$\alpha = 1$$

The smoothing determination unit 806 determines an image subjected to registration correction of smaller than one pixel and an image not subjected to it. The determination method will be described later. A tone value conversion table selection unit (not shown) selects a tone value conversion table for use (tone value conversion table shown in FIG. 10D or that shown in 11A) on the basis of the determination result.

Finally, the halftoning unit 808 performs a halftoning process, and the registration error correction unit 408 transmits the processed image data to the PWM unit 415 via the transfer buffer 414.

The PWM unit 415 connects to the mask control unit 416. The PWM unit 415 executes a process in accordance with the level of a mask control signal 417 from the mask control unit 416. More specifically, the mask control unit 416 controls the PWM unit 415 to send an output corresponding to data input from the transfer buffer 414 or to invalidate data and send an output of the default level (white level). The mask control unit 416 recognizes a drawing position on printing paper, determines whether the drawing position falls in or out a set masked area, and changes the level of the mask control signal 417. The mask control unit 416 includes independent control circuits 416C, 416M, 416Y, and 416K for the respective colors.

Figure 12A:
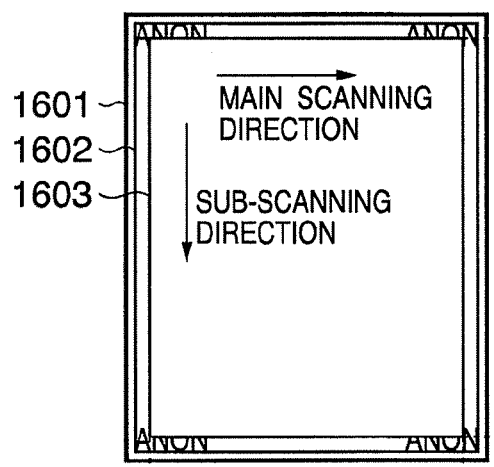
FIGS. 12A to 12C are views for explaining the concept of mask control (mask process) according to the embodiment of the present invention.
Figure 12B:
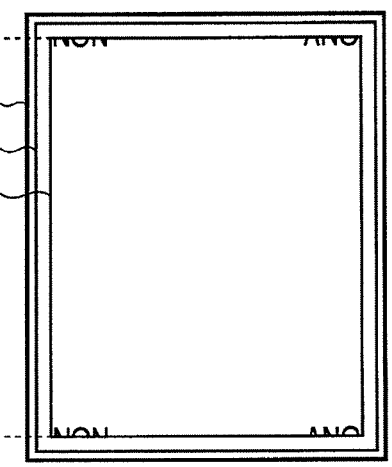
Figure 12C:
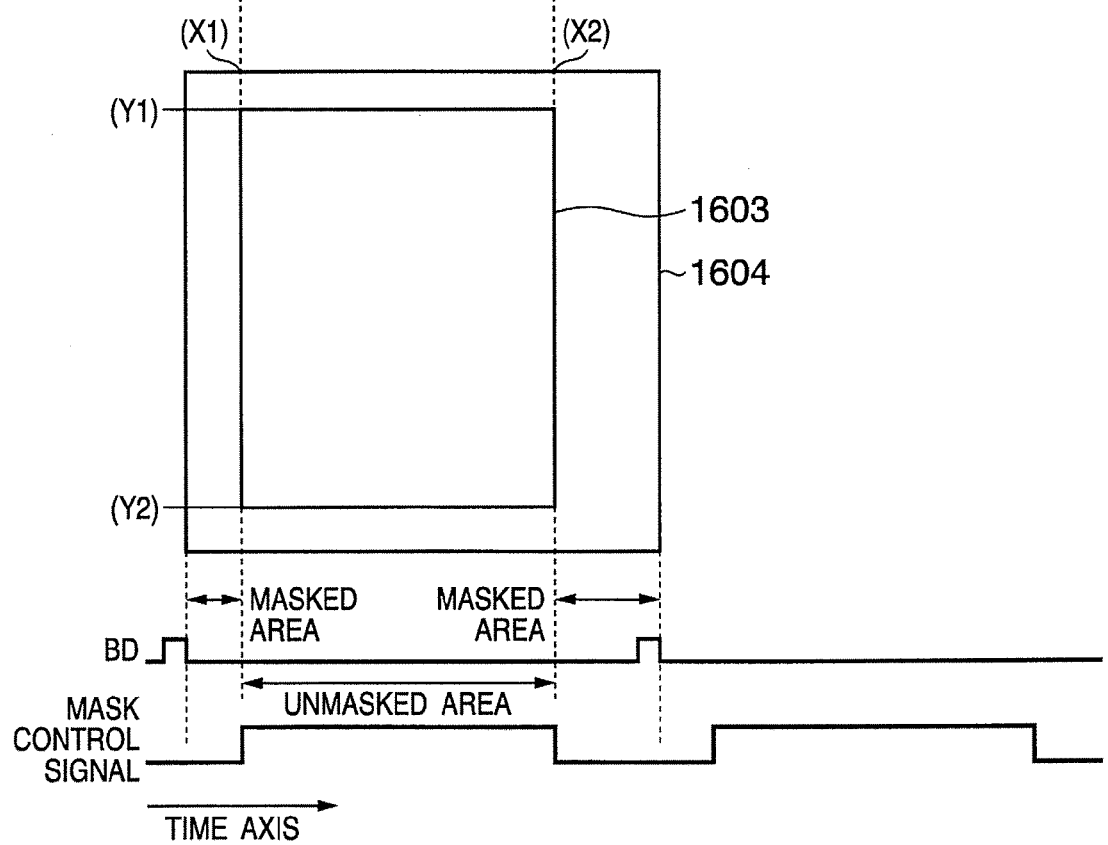

FIGS. 12A to 12C are views for explaining the concept of mask control (mask process) according to the embodiment of the present invention.

Reference numeral 1601 denotes a printing paper area; 1602, a printing image area representing the area of an image to be printed out; 1603, an unmasked area (effective image area) where output of an image is permitted; and 1604, a masked area representing an area other than the unmasked area, i.e., an area where output of an image is restricted.

FIG. 12A shows overlapping of the respective areas. FIG. 12B shows an image of a printing result in which part of the image is masked in the masked area 1604. FIG. 12C shows the relationship between the masked area 1604 and the unmasked area 1603.

When viewed two-dimensionally in correspondence with printing paper, the unmasked area 1603 is rectangular. In this area, the mask control signal 417 is at H level (ON) to permit output of printing data. The masked area 1604 is an area other than the unmasked area 1603. In this area, the mask control signal 417 is at L level (OFF) to inhibit output of printing data.

The masked area 1604 and unmasked area 1603 are designated not independently but exclusively. The position of the two-dimensionally viewed masked area 1604 is designated by four registers X1, X2, Y1, and Y2. X1 and X2 are main scanning area designation registers, whereas Y1 and Y2 are sub-scanning area designation registers.

The mask control unit 416 for each color internally manages the four registers X1, X2, Y1, and Y2.

Contrast between scanning of exposure light (beam) and the timing chart is shown below FIG. 12C. The BD signal is a horizontal scan sync signal generated by detecting a scan beam by an arranged photosensor (not shown). The masked area in the main scanning direction is set using this signal as a reference. The masked area is set during a time starting from the trailing edge of the BD signal till a time designated by the register X1. The unmasked area is set during a time designated by the registers X1 and X2. The masked area is set after a time designated by the register X2.

That is, the masked and unmasked areas can be set by defining an image output start permission position and image output end permission position.

The description in FIG. 12C is related to mask control in the main scanning direction. The same concept also applies to mask control in the sub-scanning direction. In mask control in the sub-scanning direction, BD signals are counted. The masked area is set while the number of counted lines is smaller than the number of lines designated by the register Y1. The unmasked area is set within the number of lines designated by the registers Y1 and Y2. The masked area is set after the number of lines designated by the register Y2.

The concept of printing data omission caused by image modification based on registration error correction will be described.

Figure 13A:
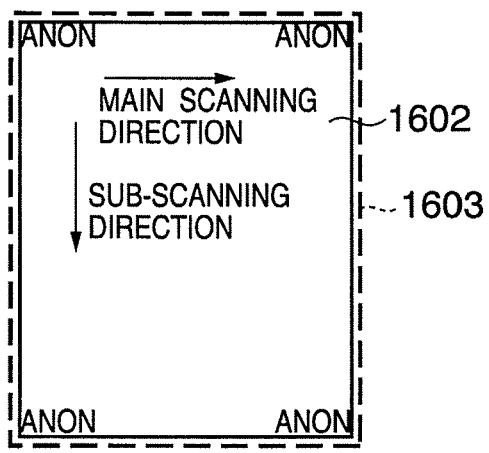
FIGS. 13A to 13F are views showing the concept of printing data omission by image modification according to the embodiment of the present invention.
Figure 13B:
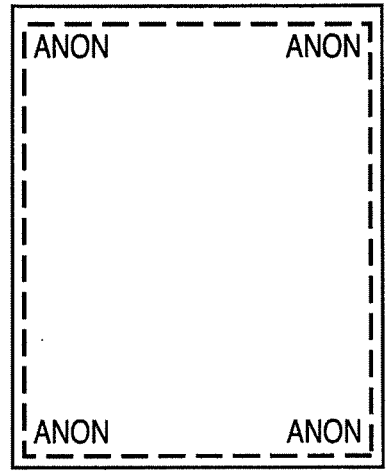

FIG. 13A shows the relationship between the printing image area 1602 before image modification and the unmasked area 1603 indicated by the broken line. FIG. 13B shows a printing result. Under control before image modification, an entire printing image is printed out without masking.

Figure 13C:
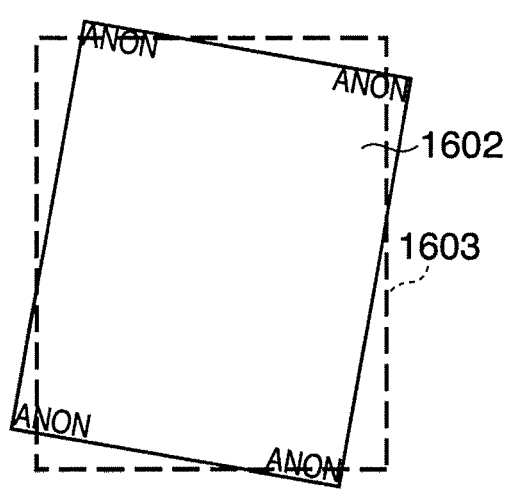
Figure 13D:
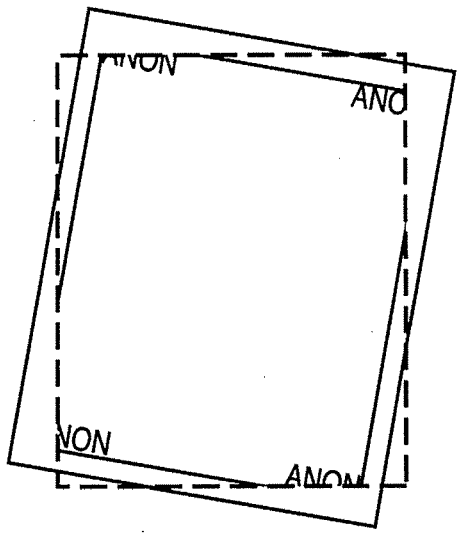

FIG. 13C shows the relationship between the printing image area 1602 after image rotation/modification and the unmasked area 1603. FIG. 13D shows a printing result. An image is modified to correct distortion of the scanner unit 24, so the printing paper area 1601 is also rotated for convenience. An image rotates, becomes mismatched with the mask shape, and is omitted.

Figure 13E:
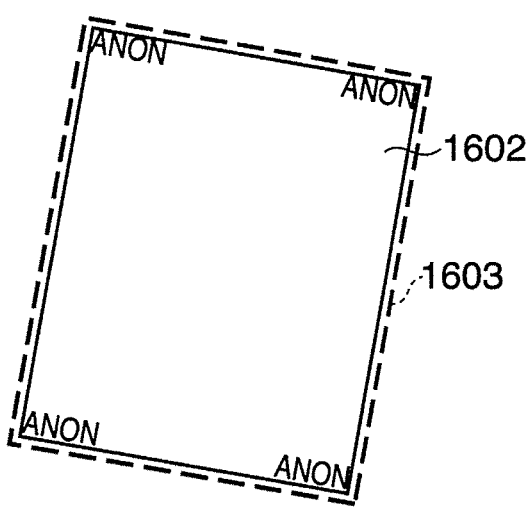
Figure 13F:
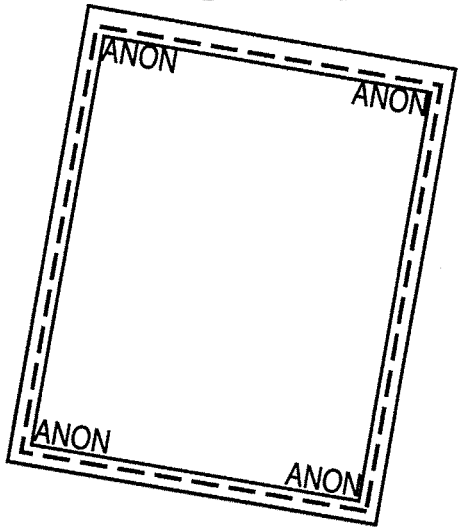

To prevent image omission, the mask control unit 416 modifies the unmasked area 1603 in accordance with image modification, as shown in FIG. 13E. FIG. 13F shows a printout result upon modifying (rotating) the unmasked area 1603.

FIGS. 14A to 14D show the concept of changing the unmasked area (masked area).

FIG. 14A shows the relationship between the printing image area 1602 before image modification and the unmasked area 1603. FIG. 14B shows the modified printing image area 1602. The masked area is designated by four register values Xa1, Xa2, Ya1, and Ya2 as described with reference to FIGS. 12A to 12C, and has a rectangular shape.

FIG. 14C shows a case of changing the unmasked area 1603 into a rectangular shape in accordance with the modified image area 1602. The masked area is changed pixel by pixel independently in the main scanning and sub-scanning directions in accordance with the relationship between a modified image and the drawing position on the basis of the calculation result of the registration error correction amount calculation unit 407. Since the image modifies in only the sub-scanning direction in FIG. 14C, FIG. 14C shows only modification of the masked area in the sub-scanning direction.

In designating the masked area, the values Xc1, Xc2, Yc1, and Yc2 of the four registers are changed to correct the size of the rectangular shape. The example of FIGS. 14A to 14D shows only modification in the sub-scanning direction, and these values have the following relations:

$$Xc1 = Xa1$$

$$Xc2 = Xa2$$

$$Yc1 = Ya1 + \Delta ac1$$

$$Yc2 = Ya2$$

where $\Delta ac1$ is determined by image modification amounts, and coincide with the maximum values of error amounts in the sub-scanning direction upon image modification.

The unmasked area 1603 is designated by a rectangular shape in FIGS. 14A and 14C, but can also be designated by another shape.

FIG. 14D shows a modification example of the unmasked area when designating the unmasked area with a shape other than the rectangular shape. In FIG. 14D, an area indicated by hatched line is only masked, unlike modification of the unmasked area with the rectangular shape in FIG. 14C.

According to this area designation method, 10 register parameters X1 and Y1 to X10 and Y10 designate positions in the main scanning and sub-scanning directions, and points represented by the registers are connected to designate an area. This process is different from the designation method in FIGS. 14A and 14C. In this case, registers for holding necessary parameters are required.

This method more reliably prevents image omission, designates the unmasked area in accordance with image modification, and does not output any unwanted image. That is, this method can set a masked area (unmasked area) of a shape similar to the modification shape of an image.

Although not shown in FIG. 14D, the unmasked area 1603 is modified when the image also modifies in the main scanning direction.

FIGS. 15A and 15B are views for explaining the interference of the unmasked area in a continuous printing operation according to the embodiment of the present invention.

FIG. 15A shows images of successive pages when not modifying any image. The inter-paper distance in FIG. 15A is the distance between printing sheets in continuous printing.

FIG. 15B shows images of pages when modifying an image and unmasked area. The distance between printing sheets is short because the image output period and unmasked area control period are long. The time corresponding to the inter-paper distance will be called the effective inter-paper time.

A short distance (the effective inter-paper time) between pages causes problems: for example, firmware for printing control cannot switch the process in the color forming apparatus of FIG. 1. To prevent this, printout is always permitted without controlling the unmasked area in the sub-scanning direction for an image modification amount at which the effective inter-paper period becomes equal to or shorter than a predetermined time necessary for a firmware process.

Note that only the single-color process has been described with reference to FIGS. 12A to 15B. When printing in four, C, M, Y, and K colors, the same control is executed independently for the respective colors to perform mask control of an image while preventing image omission. The effective inter-paper time shown in FIGS. 15A and 15B is calculated from a time considering the output periods of the C, M, Y, and K components.

A process to modify a masked area (unmasked area) along with image modification by registration error correction will be explained with reference to FIG. 16.

Figure 16:
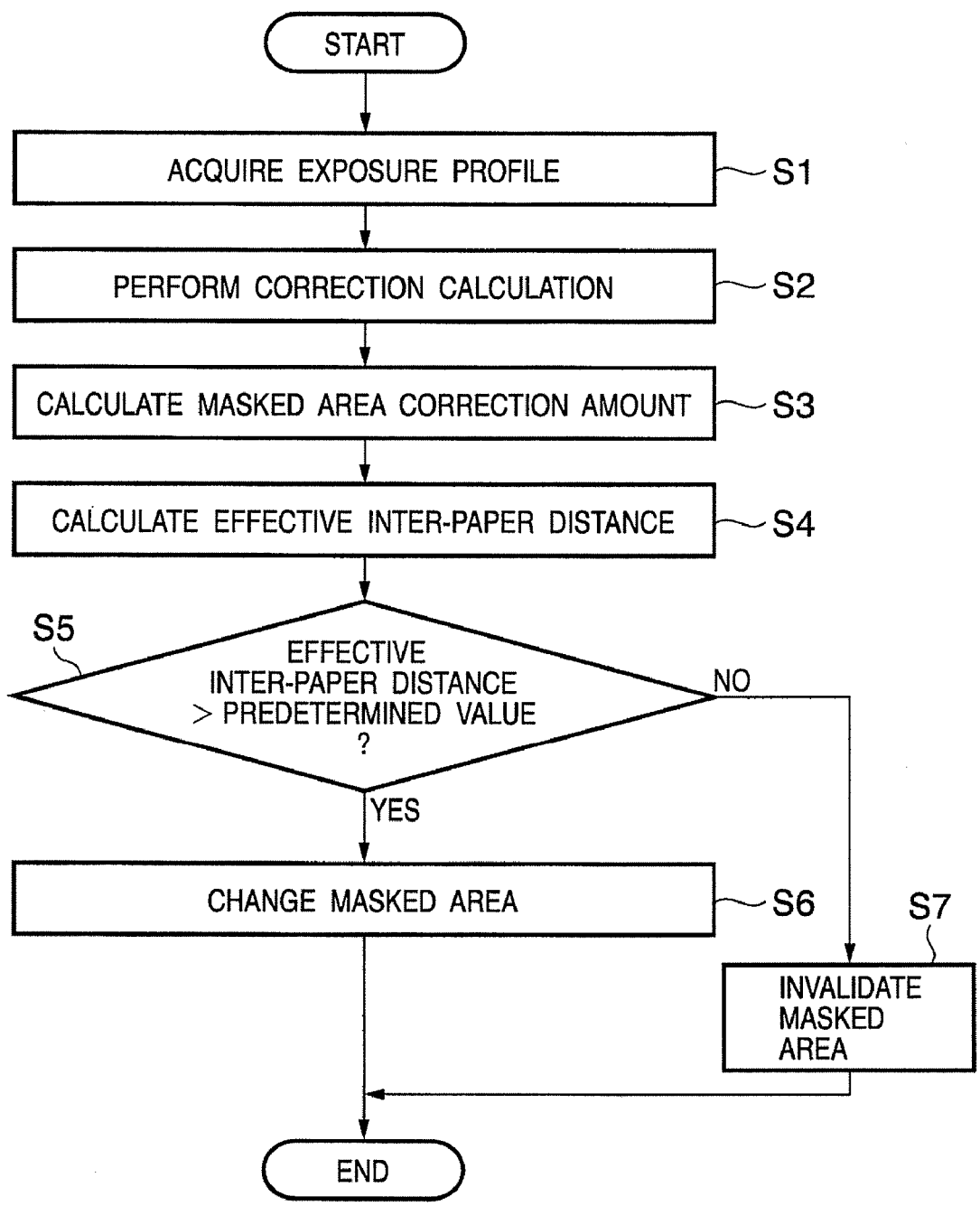
FIG. 16 is a flowchart showing a masked area (unmasked area) modification process (mask control) according to the embodiment of the present invention.

FIG. 16 is a flowchart showing the masked area (unmasked area) modification process (mask control) according to the embodiment of the present invention.

In printing, the correction value of a correction process must be calculated prior to processing image data subjected to image formation. Correction calculation for calculating a correction value suffices to be done once in the image forming section 401. More specifically, the registration error correction amount calculation units 407C, 407M, 407Y, and 407K calculate the correction amounts of pixels of the respective colors on the basis of the pieces of registration error profile information 413C, 413M, 413Y, and 413K and the engine profile information 412. In mask control, the mask control unit 416 changes the masked area in accordance with the correction amounts.

In step S1, the main CPU (not shown) of the image forming apparatus reads out and acquires an exposure profile (pieces of registration error profile information 413C, 413M, 413Y, and 413K) measured and written at the time of factory shipment.

In step S2, the registration error correction amount calculation unit 407 calculates a registration error correction amount on the basis of the exposure profile. In step S3, the registration error correction amount calculation unit 407 calculates correction data (correction amount) for changing the shape of the masked area on the basis of the maximum value of the correction value in the printing paper area for printing on the basis of the calculated registration error correction amount. Correction data of the masked area is calculated as correction data (correction amount) for changing the shape of the unmasked area.

In step S4, the effective inter-paper distance is calculated on the basis of the calculated correction data. In step S5, the calculated effective inter-paper distance is determined as follows. That is, it is determined whether the effective inter-paper distance is larger than a predetermined value serving as a guaranteed value in system design. If the effective inter-paper distance is larger than the predetermined value (YES in step S5), the process advances to step S6 to change the masked area in accordance with the correction data, and shifts to a printing process.

If the effective inter-paper distance is equal to or smaller than the predetermined value (NO in step S5), mask control is invalidated, and the process shifts to a printing process. In this case, the memory (e.g., a RAM) of the image forming apparatus sets a flag representing invalidation of mask control.

The process in FIG. 16 explains mask control especially in a continuous printing operation as shown in FIG. 15. One printing operation does not always require processes in steps S4, S5, and S7. That is, when performing a printing operation only once, since the problem of switching firmware for printing control described the above is not caused, the image forming apparatus suffices to execute only a masked area (unmasked area) modification process along with image modification by registration error correction.

The determination method in the smoothing determination unit 806 according to the embodiment will be described.

For high image quality, it is preferable not to perform registration correction of smaller than one pixel in a fine image formed from thin lines, as shown in FIGS. 17A-1 to 17A-6.

To the contrary, isolated thin lines as shown in FIGS. 17B-1 to 17B-3 desirably undergo registration correction of smaller than one pixel for high image quality.

The following determination method allows easily determining an image subjected to registration correction of smaller than one pixel and an image not subjected to it.

Figure 18:
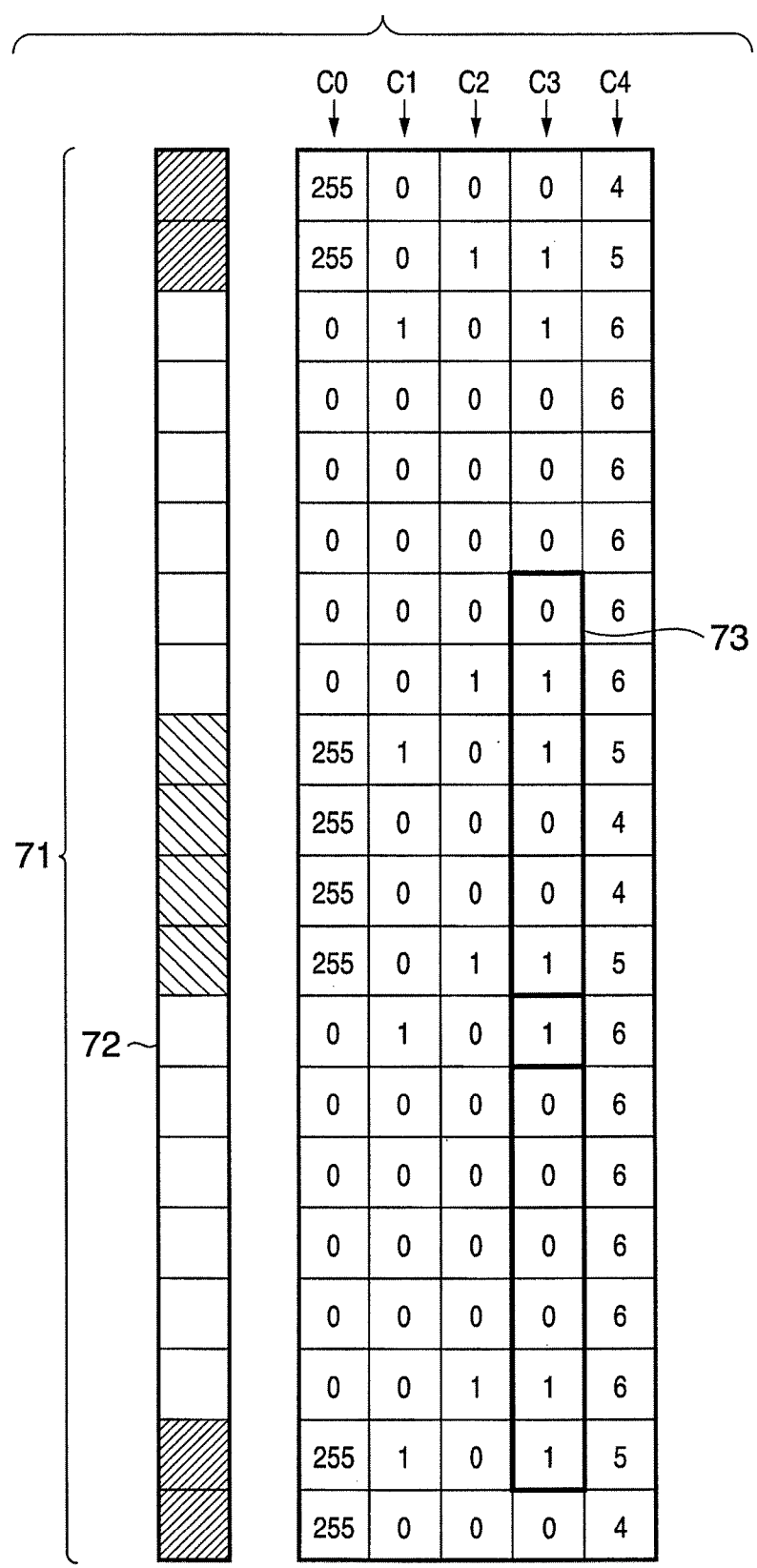
FIG. 18 is a view for explaining a determination method by a smoothing determination unit according to the embodiment of the present invention.

A patch 71 in FIG. 18 is a cutout image of one pixel×20 pixels (main scanning direction×sub-scanning direction). C0 represents the cyan tone value of each pixel, and C1 represents the binary absolute value of the difference between the tone values of a target pixel and preceding pixel.

For example, C1 is 1 when the absolute value of the difference is 128 or more. C2 represents the binary absolute value of the difference between the tone values of a target pixel and succeeding pixel. Similar to C1, C2 is 1 when the absolute value of the difference is 128 or more. C3 represents an OR value of C1 and C2. C4 represents the number of pixels with C3=1 in a window filter 73.

If C4 is 5 or more, the smoothing determination unit 806 determines that the target pixel is part of a fine image and registration correction of smaller than one pixel is not performed (is inhibited). This is because a pixel forming an isolated thin line always exhibits C4≦4 in this embodiment, as shown in FIG. 19. According to this method, the smoothing determination unit 806 can easily discriminate an isolated thin line and fine image.

The tone value of a target pixel 72 in FIG. 18 is 0, that of a preceding pixel is 255, that of a succeeding pixel is 0, and the target pixel 72 exhibits C1=1, C2=0, and C3=1. In this case, C4=6 because the window filter 73 of one pixel×13 pixels (main scanning direction×sub-scanning direction) has six pixels with C3=1.

Since C4≧5, the smoothing determination unit 806 determines that the target pixel 72 is part of a fine image. The magenta tone value M0, yellow tone value Y0, and black tone value K0 undergo the same process as that for cyan. The threshold for binarizing an image at C2 and C3 is not limited to 128. The threshold between an image subjected to registration correction of smaller than one pixel and an image not subjected to it (for which the registration correction is inhibited) should be properly determined in terms of the image quality and is not limited to C4≧5.

As described above, according to the embodiment, when electrically correcting the registration error of a printing image, the mask control unit modifies the masked area in accordance with the modification amount of an image (printing data) along with registration error correction of a target image for each color. This process can prevent the interference with the masked area shape upon image modification, and prevent image omission upon image modification.

The mask control unit can set the masked area by designating the outside of the rectangular area as the masked area. The mask control unit can also set an area containing the effective image area before modification as an area (unmasked area) not to be masked in a modified image. The embodiment can achieve both mask control and the prevention of image omission.

The mask control unit can set the masked area by designating a shape other than a rectangular area as the masked area. The mask control unit can also set, as an area (unmasked area) not to be masked, an area which is approximate to a shape similar to the shape of a modified image and contains the effective image area before modification. Even if an image greatly modifies, the embodiment can achieve both mask control and the prevention of image omission.

When the mask control unit sets the masked area in the printing paper convey direction (main scanning direction) with a predetermined correction amount or more from an initial value, it invalidates and inhibits the mask process. Since the mask process is inhibited only upon a modification process which interferes with the next page process in printing a plurality of pages, the embodiment can implement both continuous page printing and the mask process.

The mask control unit can set masked areas for respective colors, and modify the shapes of the masked areas independent between the colors in accordance with the registration correction amounts of the respective colors. Hence, the embodiment can deal with a finer change of the masked area shape.

The embodiment has exemplified a tandem type color image forming apparatus (in which image processing units each including a developing unit are juxtaposed along the printing medium convey direction), but the present invention is not limited to this. For example, the present invention is also applicable to a 1-drum type image forming apparatus using a developing unit constituted by integrating developing units for four, C, M, Y, and K colors. The 1-drum type image forming apparatus comprises at least one mask control unit to execute a mask process for each color in transferring an image of the color.

The embodiment has exemplified a color image forming apparatus, but the present invention is also applicable to a monochrome image forming apparatus.

While the present invention has been described with reference to exemplary embodiments, it is to be understood that the invention is not limited to the disclosed exemplary embodiments. The scope of the following claims is to be accorded the broadcast interpretation so as to encompass all such modifications and equivalent structures and functions.

This application claims the benefit of Japanese Patent Application No. 2005-317118 filed on Oct. 31, 2005, which is hereby incorporated by reference herein in its entirety.

What is claimed is:

1. An image forming apparatus which forms an image based on image data, and based on an unmasked area where an output of an image is permitted inside and restricted outside, by using an image processing section having an image carrier, an exposure unit which scans and exposes the image carrier, and a developing unit which visualizes, on a printing medium, an electrostatic latent image formed on the image carrier by scanning exposure of the exposure unit, comprising:

storage means for storing error amount information representing an error amount of a scanning line of exposure light from an ideal scanning line in an exposure scanning direction on the image carrier;

first modification means for modifying the image data on the basis of the error amount information stored in said storage means;

second modification means for enlarging the unmasked area so as to include an area of an image of the image data after modification by the first modification means, on the basis of the error amount information stored in said storage means, which is used for modifying the image data; and outputting means for outputting the image data having been modified by the first modification means, based on the enlarged unmasked area by the second modification means.

2. The apparatus according to claim 1, wherein said second modification means comprises holding means for holding position information of the unmasked area representing an image output start permission position and an image output end permission position between which output of the image visualized on the printing medium is permitted, and setting means for setting, in said holding means on the basis of the modification amount of the image data modified by said first modification means, the image output start permission position and the image output end permission position between which the output of the image visualized on the printing medium is defined.

3. The apparatus according to claim 1, wherein the unmasked area is a rectangular area containing a shape of the image data.

4. The apparatus according to claim 1, wherein the unmasked area is an area which contains a shape of the image data modified by said first modification means and is similar to the shape.

5. The apparatus according to claim 1, wherein said second modification means comprises:

determination means for determining whether a correction amount for enlarging the unmasked area on the basis of the modification amount of the image data modified by said first modification means is not less than a predetermined value, and decision means for deciding, on the basis of a determination result of said determination means, whether to enlarge the unmasked area.

6. The apparatus according to claim 1, wherein the developing unit includes developing units corresponding to a plurality of colors, and said second modification means enlarges the unmasked area for permitting the output of an image visualized on the printing medium in one of the plurality of colors by a developing unit corresponding to the color.

7. The apparatus according to claim 6, wherein the developing units corresponding to the plurality of colors are juxtaposed in a convey direction of the printing medium, and said storage means, said first modification means, and said second modification means are arranged for each developing unit corresponding to one of the plurality of colors.

8. The apparatus according to claim 1, wherein the developing unit is constituted by integrating developing units corresponding to a plurality of colors, and said second modification means enlarges the unmasked area for restricting the output of an image visualized on the printing medium in one of the plurality of colors by the developing unit corresponding to the color.

9. The apparatus according to claim 1, wherein the enlarged unmasked area contains the unmasked area before enlargement by said second modification means.

10. The apparatus according to claim 1, wherein said outputting means outputs data where a part of the image data having been modified by the first modification means is invalidated, the part of the image data corresponding to the outside of the enlarged unmasked area by the second modification means.

11. The apparatus according to claim 1, wherein the unmasked area to be enlarged corresponds to an area inside of the printing medium.

12. A method of controlling an image forming apparatus which forms an image based on image data, and based on an unmasked area where an output of an image is permitted inside and restricted outside, by using an image processing section having an image carrier, an exposure unit which scans and exposes the image carrier, and a developing unit which visualizes, on a printing medium, an electrostatic latent image formed on the image carrier by scanning exposure of the exposure unit, comprising:

an acquisition step of acquiring error amount information which is stored in a storage medium and which represents an error amount of a scanning line of exposure light from an ideal scanning line in an exposure scanning direction on the image carrier;

a first modification step of modifying the image data on the basis of the error amount information acquired in the acquisition step;

a second modification step of enlarging the unmasked area so as to include an area of an image of the image data after modification by the first modification step, on the basis of the error amount information stored in said storage step, which is used for modifying the image data; and an outputting step of outputting the image data having been modified by the first modification step, based on the enlarged unmasked area by the second modification step.

13. A program which is retrievably stored in a non-transitory computer-readable storage medium and which causes a computer to control an image forming apparatus which forms an image based on image data, and based on an unmasked area where an output of an image is permitted inside and restricted outside, by using an image processing section having an image carrier, an exposure unit which scans and exposes the image carrier, and a developing unit which visualizes, on a printing medium, an electrostatic latent image formed on the image carrier by scanning exposure of the exposure unit, causing the computer to execute:

an acquisition step of acquiring error amount information which is stored in a storage medium and which represents an error amount of a scanning line of exposure light from an ideal scanning line in an exposure scanning direction on the image carrier;

a first modification step of modifying the image data on the basis of the error amount information acquired in the acquisition step;

a second modification step of enlarging the unmasked area so as to include an area of an image of the image data after modification by the first modification step, on the basis of the error amount information stored in said storage step, which is used for modifying the image data; and an outputting step of outputting the image data having been modified by the first modification step, based on the enlarged unmasked area by the second modification step.

* * * * *